United States Patent
Zhong et al.

(10) Patent No.: US 10,778,621 B2
(45) Date of Patent: Sep. 15, 2020

(54) LOCATION INTEGRATION INTO ELECTRONIC MAIL SYSTEM

(71) Applicant: Microsoft Technology Licensing, LLC, Redmond, WA (US)

(72) Inventors: Lin Zhong, Bellevue, WA (US); Shahil Soni, Seattle, WA (US)

(73) Assignee: Microsoft Technology Licensing, LLC, Redmond, VA (US)

( * ) Notice: Subject to any disclaimer, the term of this patent is extended or adjusted under 35 U.S.C. 154(b) by 255 days.

(21) Appl. No.: 15/173,959

(22) Filed: Jun. 6, 2016

(65) Prior Publication Data

US 2017/0353411 A1 Dec. 7, 2017

(51) Int. Cl.
*G06F 15/16* (2006.01)
*H04L 12/58* (2006.01)
*G06Q 10/10* (2012.01)
*H04L 29/08* (2006.01)

(52) U.S. Cl.
CPC ........... *H04L 51/08* (2013.01); *G06Q 10/107* (2013.01); *H04L 67/18* (2013.01)

(58) Field of Classification Search
CPC ........ G06Q 10/107; H04L 51/08; H04L 67/18
USPC .......................................... 709/206; 109/206
See application file for complete search history.

(56) References Cited

U.S. PATENT DOCUMENTS

| | | | |
|---|---|---|---|
| 7,085,629 B1 | 8/2006 | Gotou et al. | |
| 7,370,079 B2 | 5/2008 | Murata et al. | |
| 8,140,627 B2 | 3/2012 | Lasensky et al. | |
| 8,717,166 B2 | 5/2014 | Diem | |
| 8,745,141 B2 | 6/2014 | Rosenberg et al. | |
| 8,750,906 B2 | 6/2014 | Winkler et al. | |
| 8,751,609 B2 | 6/2014 | Chen | |
| 9,046,981 B2 | 6/2015 | Campbell et al. | |
| 9,055,402 B2 | 6/2015 | Sanchez et al. | |
| 2005/0125284 A1* | 6/2005 | Fairbaugh | G07B 15/02 705/13 |
| 2006/0200382 A1 | 9/2006 | Arutunian et al. | |
| 2007/0061423 A1 | 3/2007 | Accapadi et al. | |
| 2008/0034047 A1 | 2/2008 | Rosenberg et al. | |
| 2008/0109712 A1 | 5/2008 | McBrearty et al. | |

(Continued)

FOREIGN PATENT DOCUMENTS

| | | |
|---|---|---|
| EP | 1239392 A2 | 9/2002 |
| EP | 1950984 A1 | 7/2008 |

(Continued)

OTHER PUBLICATIONS

"How do I add a Google map to my Classic Wizard email?", Retrieved on: Apr. 12, 2016 Available at: http://support2.constantcontact.com/articles/SupportFAQ/3580?l=en_US&fs=RelatedArticle.

(Continued)

*Primary Examiner* — Oscar A Louie
*Assistant Examiner* — Oluwatosin M Gidado
(74) *Attorney, Agent, or Firm* — Christopher J. Volkmann; Kelly, Holt & Christenson, PLLC

(57) ABSTRACT

An electronic mail system detects actuation of location integration functionality and populates a compose pane in the electronic mail system with an interactive map display, that is populated in-line with other message content in the compose pane. A user can interact with the interactive map display to perform mapping functionality to modify the interactive map display.

20 Claims, 17 Drawing Sheets

(56) References Cited

U.S. PATENT DOCUMENTS

| | | | | |
|---|---|---|---|---|
| 2008/0162037 | A1 | 7/2008 | Hasan Mahmoud | |
| 2008/0168369 | A1 | 7/2008 | Tadman et al. | |
| 2009/0112457 | A1* | 4/2009 | Sanchez | G01C 11/34 701/533 |
| 2010/0125478 | A1* | 5/2010 | Bisht | G06Q 10/109 705/7.19 |
| 2011/0136505 | A1* | 6/2011 | Stewart | G06Q 50/01 455/456.1 |
| 2011/0320114 | A1 | 12/2011 | Buxton et al. | |
| 2012/0316782 | A1* | 12/2012 | Sartipi | G01C 21/367 701/455 |
| 2013/0283211 | A1 | 10/2013 | Malkin et al. | |
| 2014/0365107 | A1* | 12/2014 | Dutta | G01C 21/343 701/408 |
| 2017/0124266 | A1* | 5/2017 | Hasan | G06Q 10/02 |

FOREIGN PATENT DOCUMENTS

| | | | |
|---|---|---|---|
| WO | 2009009433 | A2 | 1/2009 |
| WO | 2009158398 | A1 | 12/2009 |

OTHER PUBLICATIONS

International Search Report and Written Opinion for International Patent Application No. PCT/US2017/034103, dated Jul. 19, 2017, date of filing May 24, 2017, 13 pages.
"Written Opinion and Search Report Issued in Singapore Application No. 11201810418X", dated Nov. 13, 2019, 7 Pages.
"Office Action Issued in Colombian Patent Application No. NC2018/0013179", dated Jan. 22, 2020, 22 Pages.

* cited by examiner

US 10,778,621 B2

1

LOCATION INTEGRATION INTO ELECTRONIC MAIL SYSTEM

BACKGROUND

Computer systems are currently in wide use. Some such computer systems include electronic mail systems. Electronic mail systems allow users to compose, send and receive electronic mail messages and perform other electronic mail system functionality.

Other computing systems include location systems, such as mapping systems. Mapping systems expose user input mechanisms that allow users to enter location information. The location information is then used to display a map to the user. Some mapping systems expose user input mechanisms that allow users to mark certain locations on the displayed map. This is sometimes described as placing a pin or other location marker on the map.

Some electronic mail systems allow a user to attach location information, provided by a mapping system, to an electronic mail message. In order to view the location information, a recipient opens the attachment. In other scenarios, a user can paste a link to location information in an electronic mail message. When a recipient wishes to view the location information, the recipient actuates the link and is navigated to a separate user experience for viewing the location information.

The discussion above is merely provided for general background information and is not intended to be used as an aid in determining the scope of the claimed subject matter.

SUMMARY

An electronic mail system detects actuation of location integration functionality and populates a compose pane in the electronic mail system with an interactive map display, that is populated in-line with other message content in the compose pane. A user can interact with the interactive map display to perform mapping functionality to modify the interactive map display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

2

Figure 6:
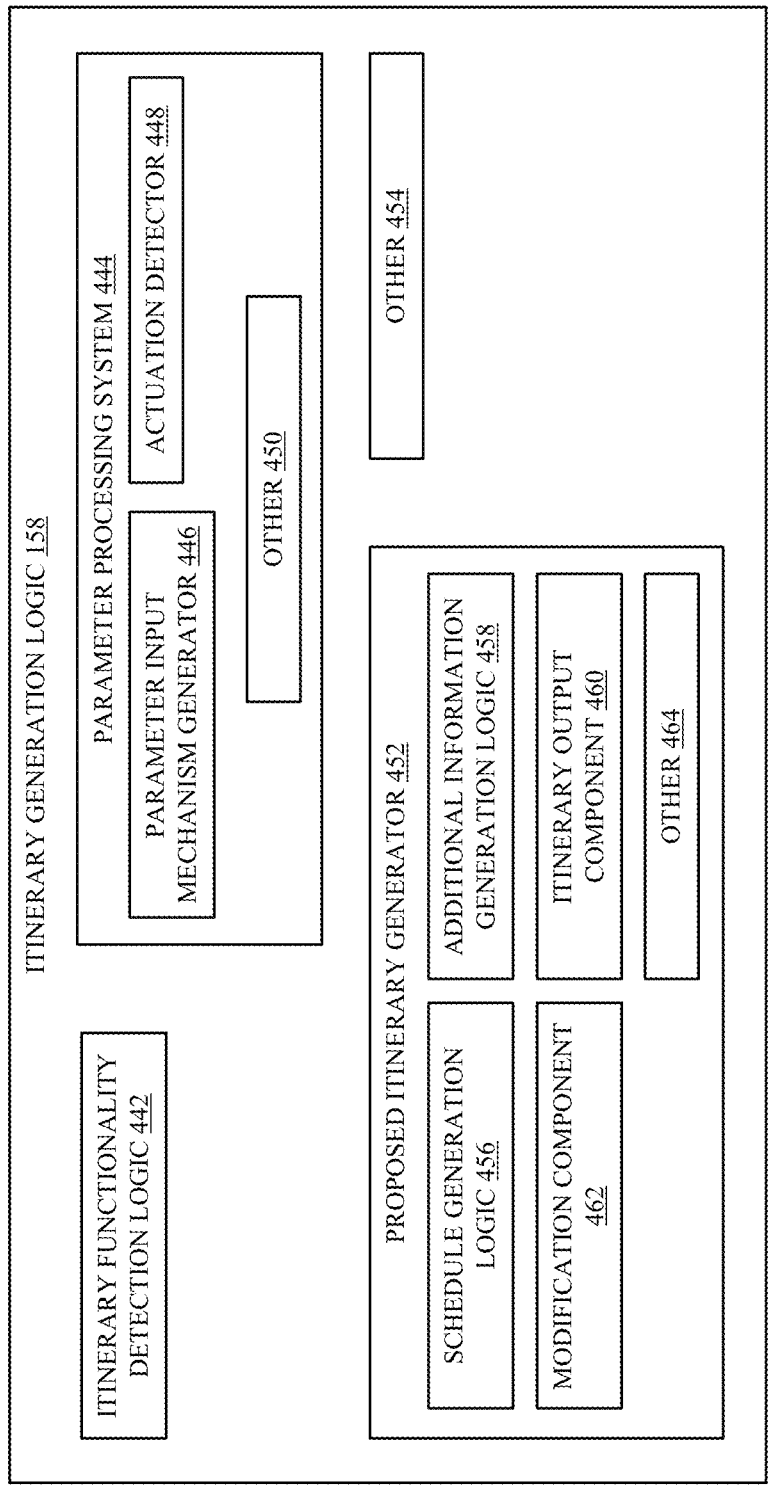

FIG. 6 is a block diagram showing one example of itinerary generation logic in more detail.

Figure 1:
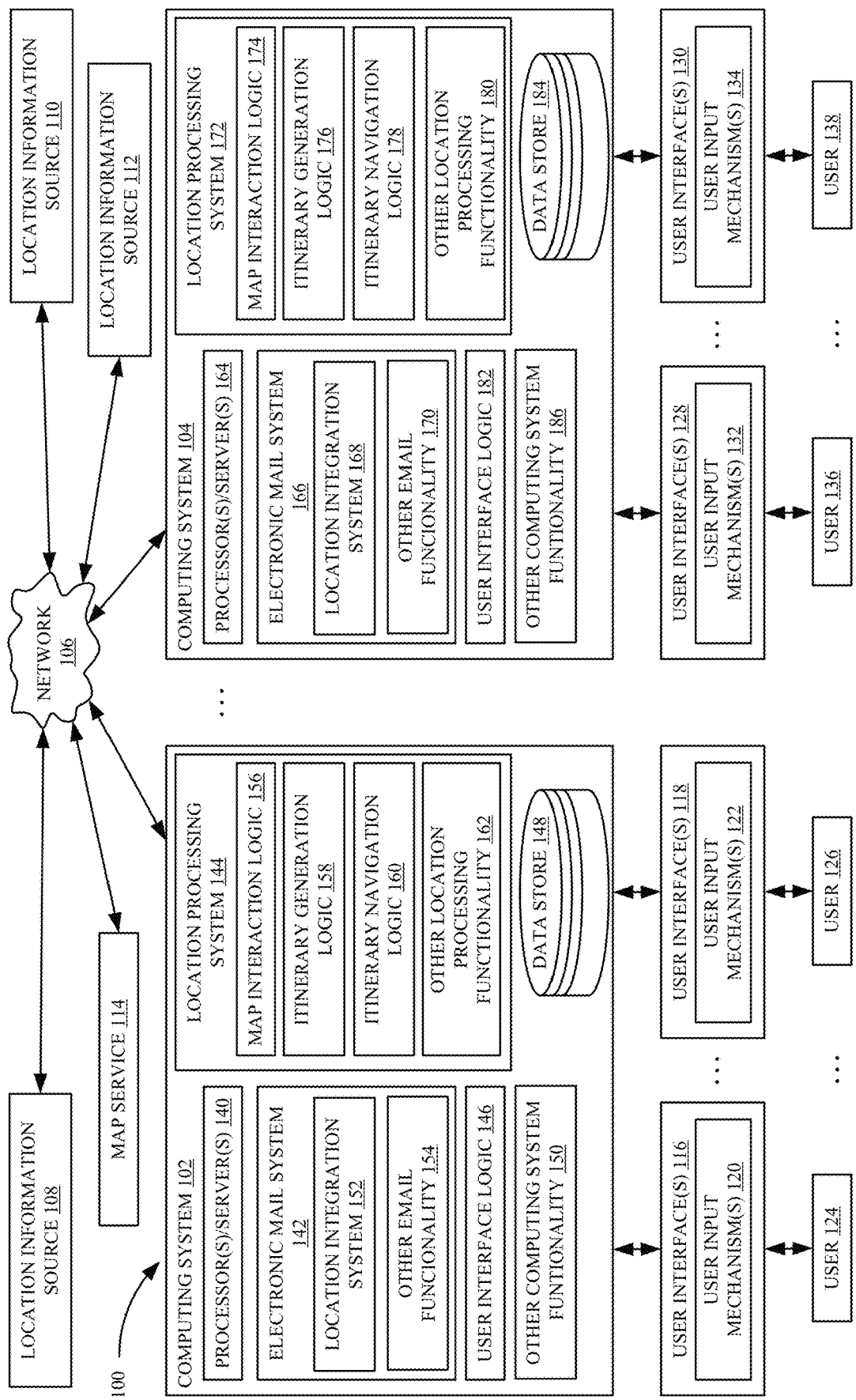
FIG. 1 is a block diagram of one example of a computing system architecture.
Figure 7:
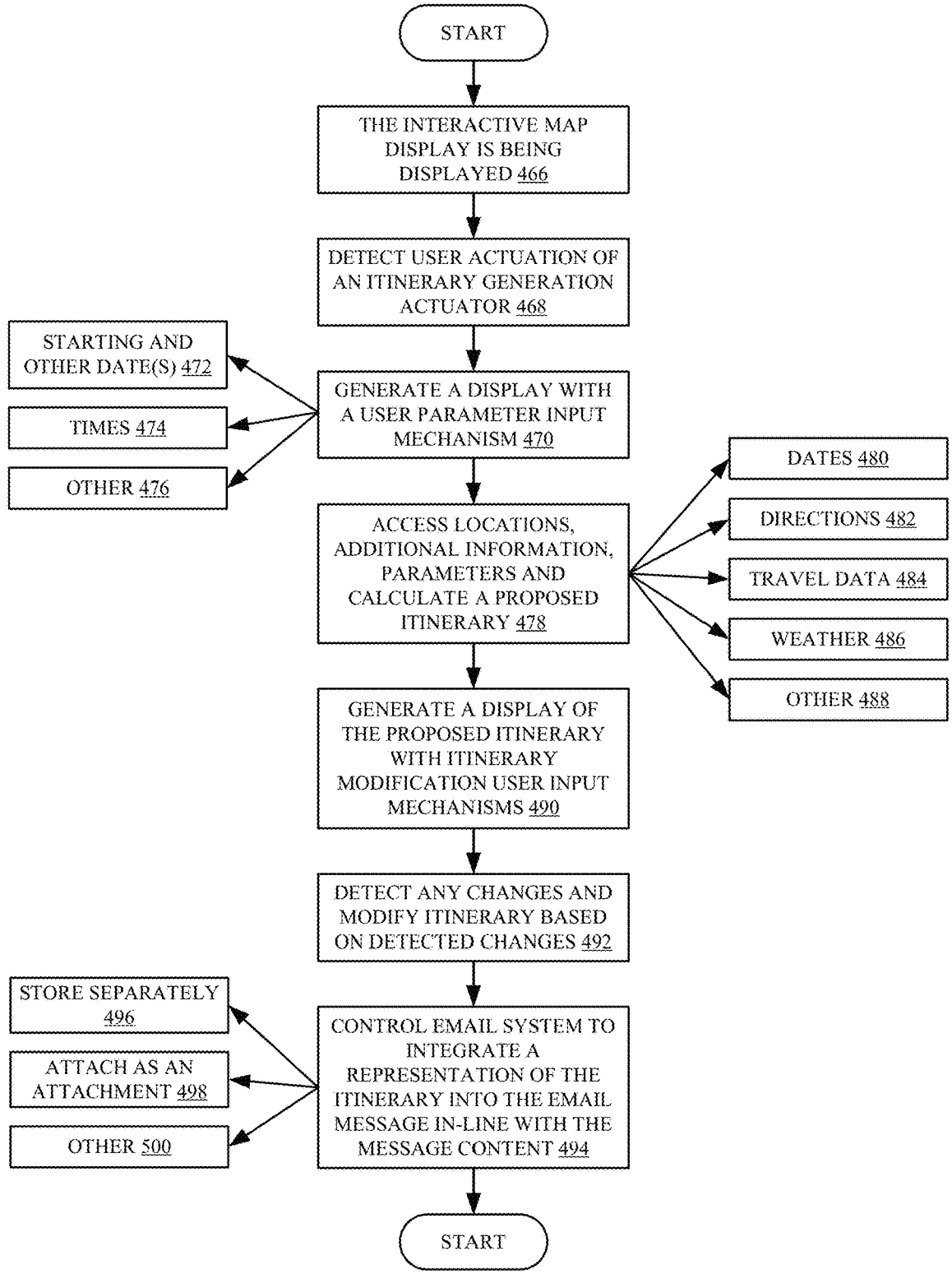

FIG. 7 is a flow diagram illustrating one example of the operation of the architecture shown in FIG. 1, and the itinerary generation logic, in allowing a user to generate an itinerary.

Figure 7A:
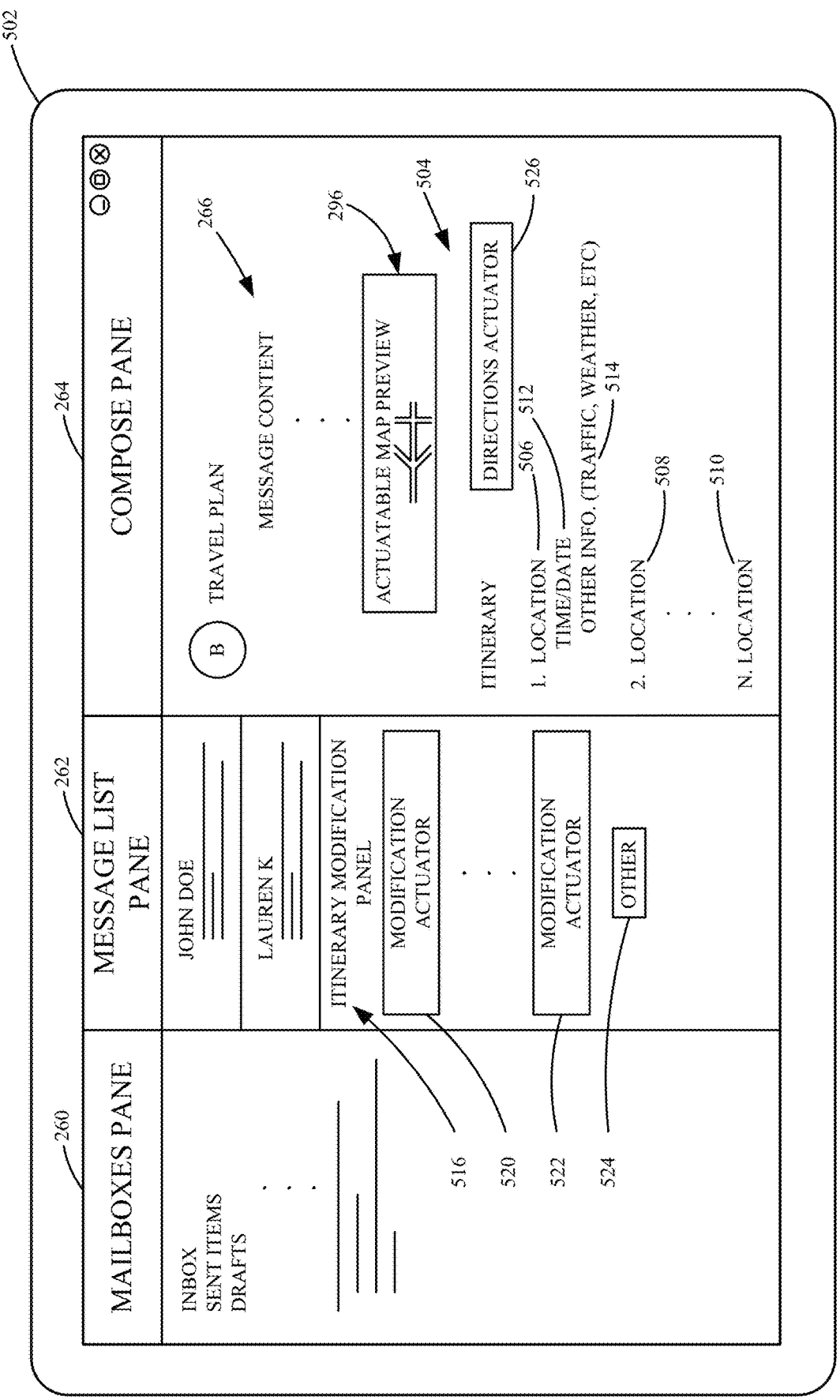

FIG. 7A is one example of a user interface display.

Figure 8:
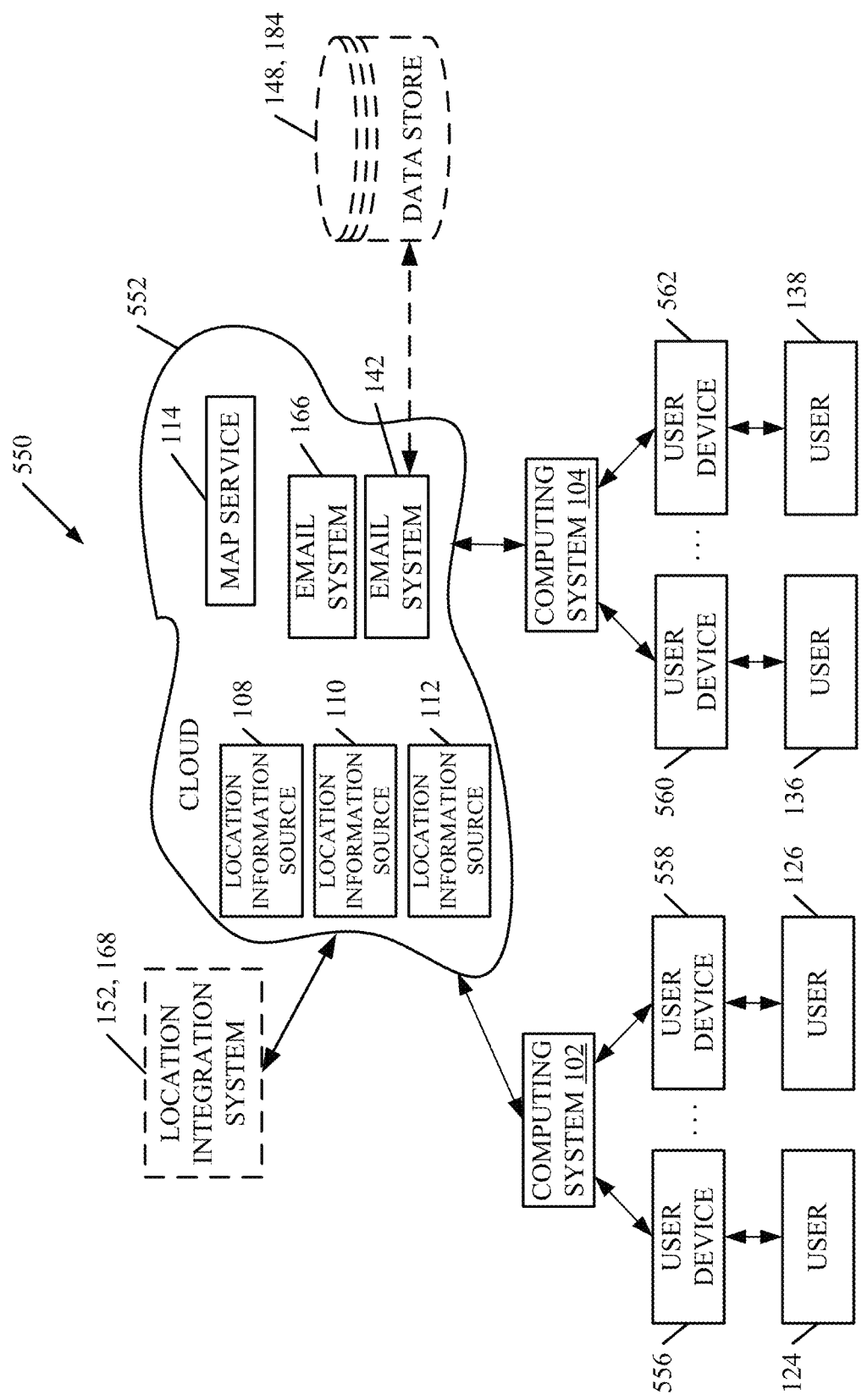

FIG. 8 shows the architecture of FIG. 1, deployed in a cloud computing architecture.

Figure 9:
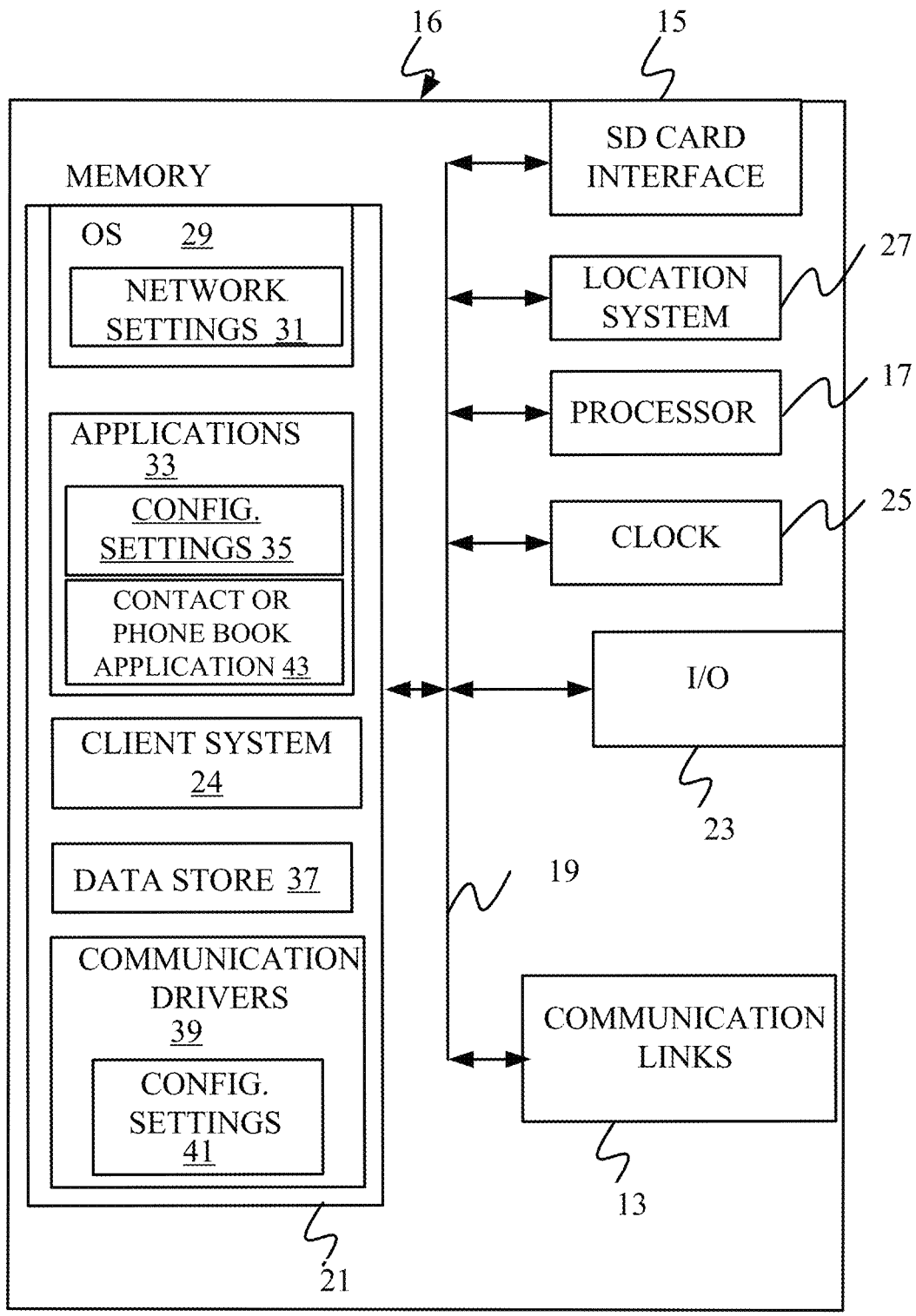
Figure 10:
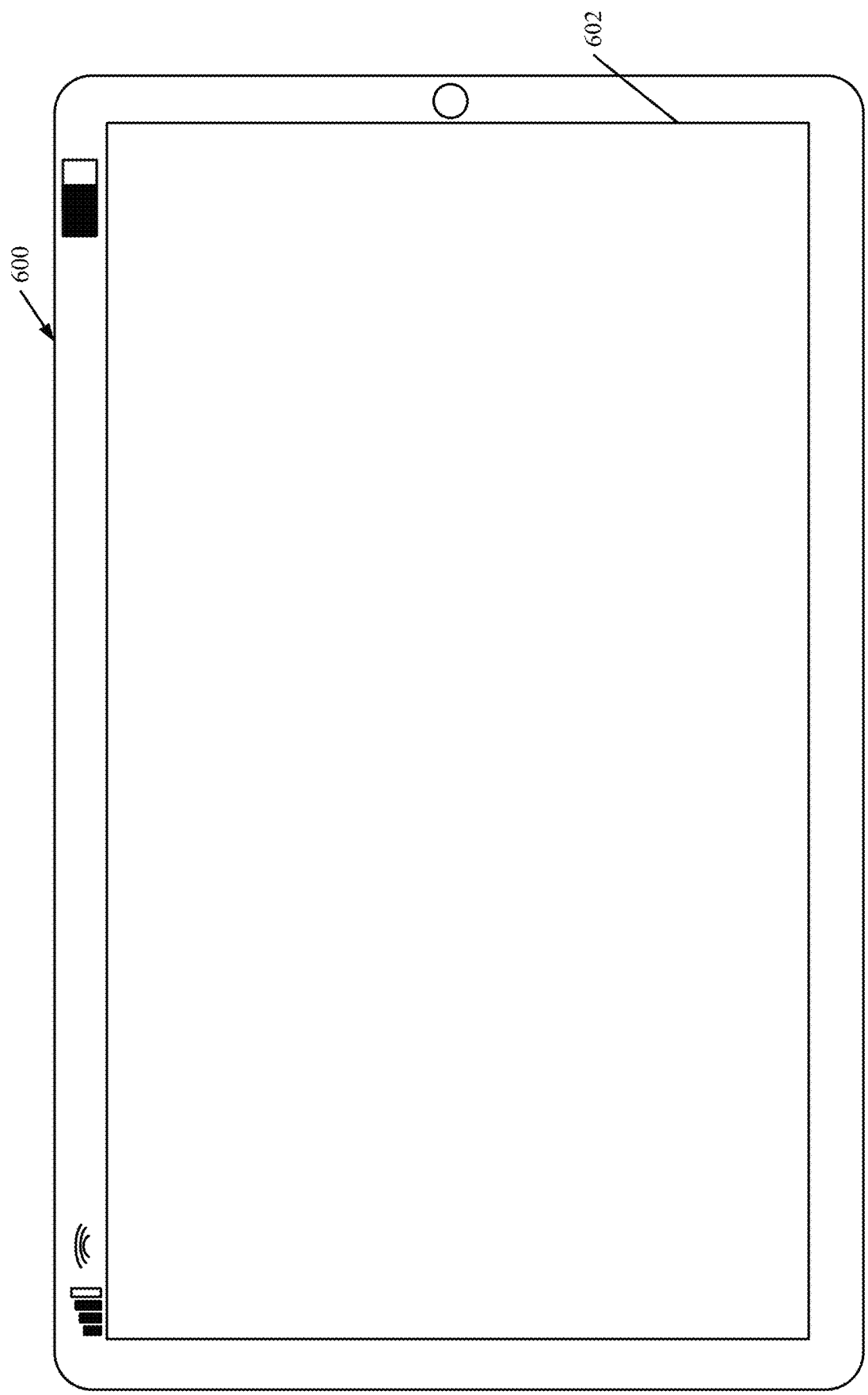
Figure 11:
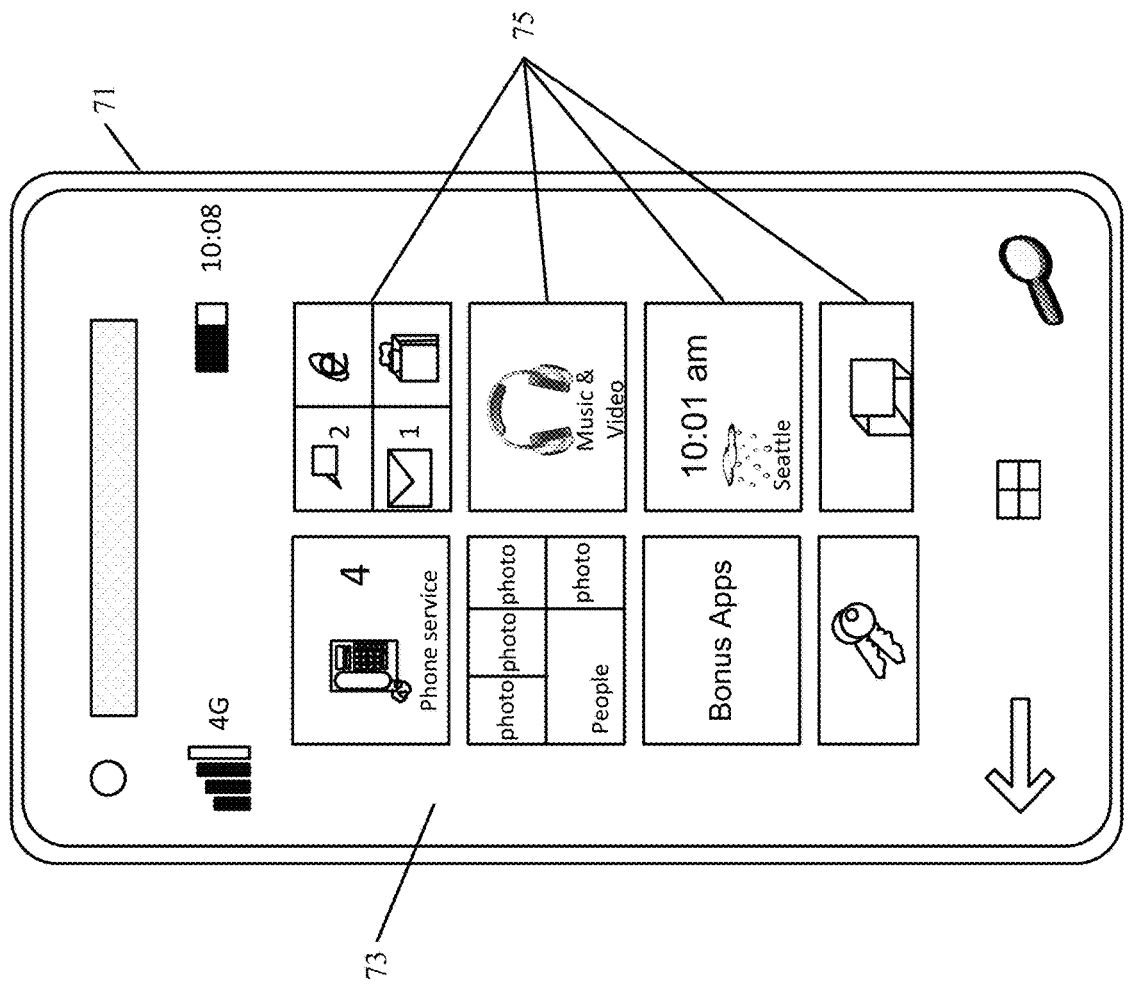

FIGS. 9-11 are examples of mobile devices that can be used in the architectures of the previous Figures.

Figure 12:
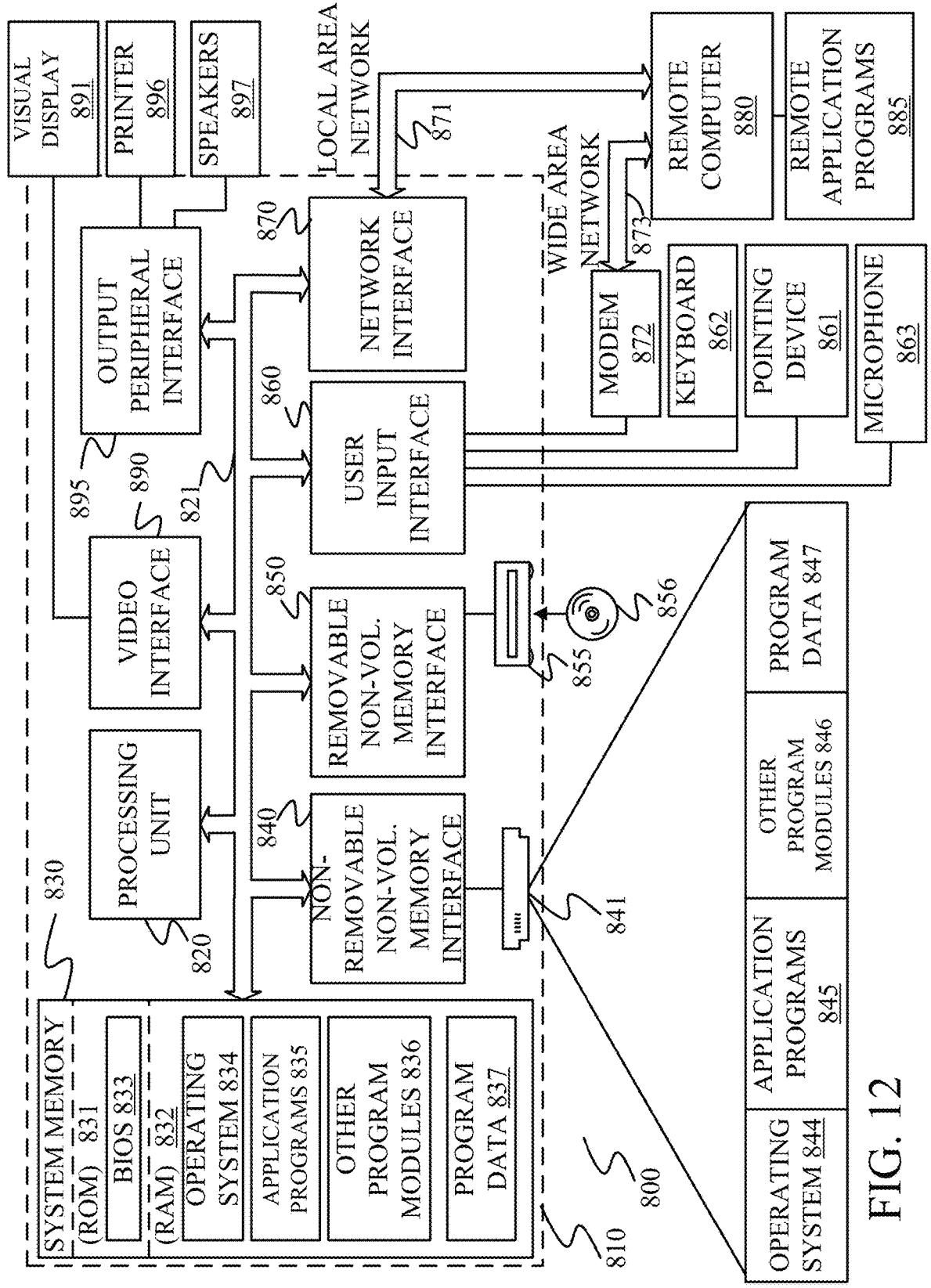

FIG. 12 is a computing environment that can be used in the architectures of the previous Figures.

DETAILED DESCRIPTION

FIG. 1 is a block diagram of one example of a computing system architecture 100. Architecture 100 illustratively includes computing systems 102-104 connected to one another through network 106. Network 106 can be any of a wide variety of different types of networks, such as a wide area network, a local area network, a near field communication network, among others.

FIG. 1 also shows that, in one example, architecture 100 includes a plurality of different location information sources 108, 110, 112, and it can include a map service 114. Location information sources 108-112 are illustratively sources that provide information based on location. For instance, one of location information sources 108-112 may be a weather information service that exposes an interface (such as an API) that can be called to obtain weather forecast information based on location. Another source 108-112 may be a traffic information service that exposes an API to provide current or predicted traffic information based upon location. Sources 108-112 may also include services that provide information indicative of hotels, embassies, restaurants, points of interest or a wide variety of other information, based upon location.

Map service 114 is illustratively a service that can be called by computing systems 102-104 to obtain mapping information. In one example, the various location information sources 108-112 and map service 114 illustratively expose application programming interfaces (or APIs) that can be consumed or interacted with by computing systems 102-104 in order to obtain information from the various information sources and services.

Computing system 102 is shown generating user interfaces 116-118 with user input mechanisms 120-122 for interaction by users 124-126, respectively. Users 124-126 illustratively interact with user input mechanisms 120-122 in order to control and manipulate computing system 102.

Similarly, computing system 104 is shown generating user interfaces 128-130 with user input mechanisms 132-134 for interaction by users 136-138. Users 136-138 illustratively interact with user input mechanisms 132-134, respectively, in order to control and manipulate computing system 104.

Computing system 102 illustratively includes processors or servers 140, electronic mail system 142, location processing system 144, user interface logic 146, data store 148, and it can include a wide variety of other computing system functionality 150. E-mail system 142 illustratively includes location integration system 152 and a wide variety of other e-mail functionality 154. Location processing system 144 illustratively includes map interaction logic 156, itinerary generation logic 158, itinerary navigation logic 160, and it can include a wide variety of other location processing functionality 162.

Electronic mail system 142 can be an email service or a client component of an email service, or a combination. It illustratively generates user interface displays with user input mechanisms that allow users 124-126 to perform electronic mail operations, such as compose messages, send and receive messages, reply to messages, attach items, arrange mailbox folders, etc. Location integration system 152 illustratively allows the users to integrate location information in the form of an interactive map display into electronic mail messages. In doing so, system 152 integrates the interactive map display into the electronic mail message in-line with other message content, to form a location message.

Location processing system 154 illustratively performs processing based on location information. It can, itself, be a local mapping system, or it can be a client component of map service 114, as an example. Thus, in processing location information, it can access map service 114, or do processing on its own, or do a combination of the two, or perform location processing in other ways. Map interaction logic 156 illustratively generates information that can be used in generating the interactive map display, that is then integrated into an electronic mail message by location integration system 152. It illustratively detects user interaction with the user input mechanisms on the interactive map display and performs processing based on those detected user interactions. It can do this when the user interacting with the location message is the author of the message, or a recipient.

Itinerary generation logic 158 illustratively accesses information in the location message generated by the user and automatically (either on its own or in response to a user input), generates a proposed or suggested itinerary based on the location information and other information integrated into the e-mail system. It also illustratively generates user input mechanisms that allow the user to modify the itinerary.

Itinerary navigation logic 160 illustratively generates navigation functionality that allows the user to navigate to various points on the itinerary, when the user is using the itinerary. It illustratively provides directions, traffic information, and other information, such as when to leave for a particular location, given current traffic and weather conditions, etc. It can facilitate a wide variety of other navigation functionality as well.

Data store 148 illustratively stores various applications, and information for both e-mail system 142 and location processing system 144. It can store a wide variety of other information as well.

Computing system 104 also illustratively includes processors or servers 164, e-mail system 166 (which, itself, includes location integration system 168 and other e-mail functionality 170), location processing system 172 (which, itself, includes map interaction logic 174, itinerary generation logic 176, itinerary navigation logic 178 and other location processing functionality 180), user interface logic 182, data store 184, and it can include other computing system functionality 186. The components or items in computing system 104 can be similar to, and operate in similar ways as, those described above with respect to computing system 102, or they can be different.

Figure 2:
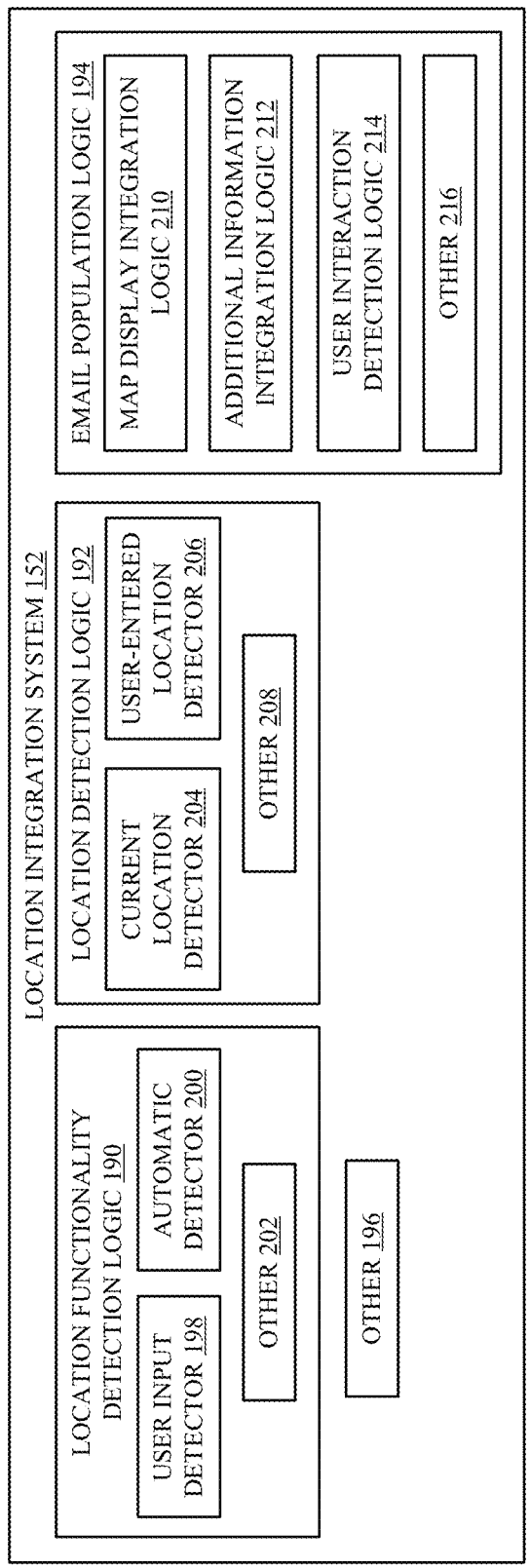
FIG. 2 is a more detailed block diagram of a location integration system.

Before describing one example of the operation of architecture 100 in generating a location message in more detail, a block diagram showing a more detailed example of location integration system 152 will first be provided. FIG. 2 shows a more detailed block diagram of one example of location integration system 152. In the example shown in FIG. 2, system 152 illustratively includes location functionality detection logic 190, location detection logic 192, e-mail population logic 194, and it can include other items 196. Location functionality detection logic 190 illustratively detects when the functionality of a location integration system 152 is to be activated (e.g., when the user is creating or interacting with a location message). It can include user input detector 192, automatic detector 194, and a wide variety of other items 196. User input detector 192 illustratively detects a user input requesting that the functionality of system 152 be activated. For instance, an e-mail compose pane may have a location actuator disposed thereon. When the user actuates that actuator, then location integration system 152 is activated. In another example, automatic detector 194 automatically detects that the functionality of system 152 should be activated. For instance, when the user enters a location into the body of message content in an e-mail message, this may be detected by a natural language processing or other linguistic processing system, that provides an input to automatic detector 194 indicating that the functionality of location integration system should be activated. In another example, the content of an e-mail message may be subjected to natural language processing or natural language understanding and this may give rise to automatic activation of the functionality of system 152.

For instance, a user may type in a sentence fragment such as "We will be visiting the following location on April $1^{st}$:". This type of linguistic content may be detected and used to automatically trigger the actuation of the functionality of location integration system 152. Other automatic user input detectors can be used as well, and those described herein are described for the sake of example only.

Location detection logic 192 illustratively detects a specific location that the system uses for generation of the interactive map display. In one example, logic 192 includes current location detector 204, user-entered location detector 206, and it can include other items 208. Current location detector 204 illustratively automatically detects the current location of system 152. This can be done using, for instance, a global positioning system receiver or another automatic location detector. In one example, the user's current location is the location that is used to generate the interactive map display.

In another example, user-entered location detector 206 detects a user-entered location. For instance, an actuator (such as a text entry field or other actuator) may be provided for the user to enter a desired location. As an example, if the user is planning a trip to a remote location, the user may enter location information identifying the remote location, and it is that location information that is used to generate the interactive map display. Other location detectors can be used as well.

E-mail population logic 194 illustratively includes map display integration logic 210, additional information integration logic 212, user interaction detection logic 214, and it can include other items 216. Map display integration logic 210 illustratively uses the location information detected by location detection logic 192 to interact with a map system (such as location processing system 144 or map service 114) in order to obtain information used to generate an interactive map display, based upon that location. It generates that interactive map display, formats it using appropriate dimensions, etc., for the pane and integrates it into an e-mail message, in line with other message content.

Additional information integration logic 212 illustratively interfaces with other sources of information 108-112 that may be sought by the user, or provided to the user, when the user is composing or responding to a location message and integrates that information into the email message. Such information may include the locations of hotels, restaurants, embassies, points of interest, etc. It may include information indicative of traffic patterns, mass transit facilities, or a wide variety of other information related to the location detected by location detection logic 192.

User interaction detection logic 214 illustratively detects user interaction with the interactive map display, and any actuators or information displayed thereon, and provides an indication of the user interaction to the other items in computing system 102 in order to perform desired actions.

Figure 3:
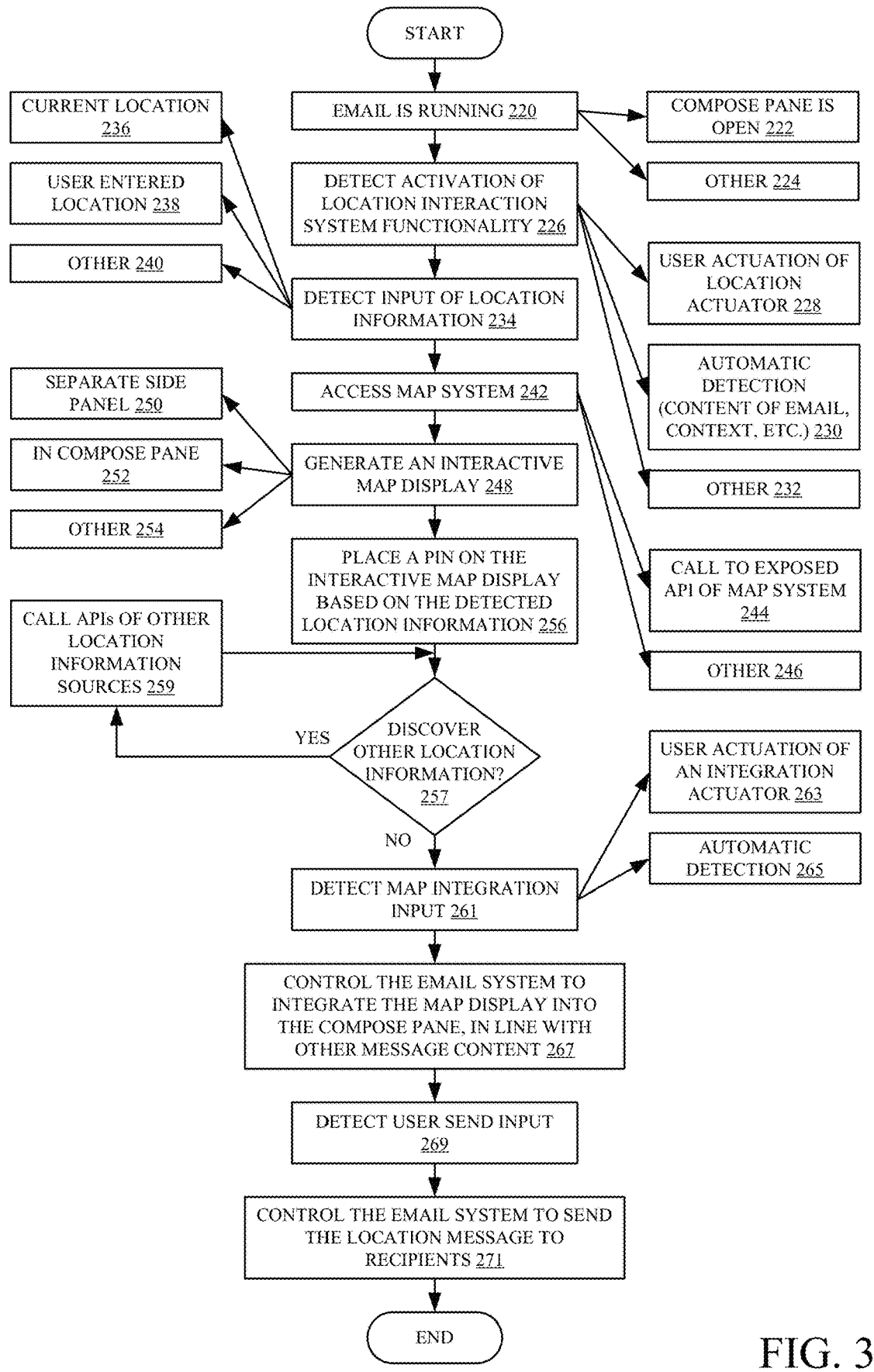
FIG. 3 is a flow diagram illustrating one example of the operation of the architecture shown in FIG. 1 in allowing a user to author a location message.

FIG. 3 is a flow diagram illustrating one example of the operation of architecture 100 and location integration system 152 in integrating an interactive map display in-line with message content in an e-mail message, when a user is authoring an e-mail message. FIGS. 3A-3D show examples of user interface displays. FIGS. 1-3D will now be described in conjunction with one another. Also, the present discussion will proceed with respect to user 124 authoring a location message (an e-mail message with an interactive map display displayed in-line with message content). This is by way of example only.

It is thus assumed that e-mail system 142 is running and that user 124 is in a mode in which user 124 can compose an e-mail message. This is indicated by blocks 220 and 222. In one example, e-mail system 142 displays a compose pane that allows the user to enter message content (such as through a keyboard, keypad, voice, etc.). Opening a compose pane in the e-mail system is indicated by block 222. The e-mail system 142 can provide other functionality that allows user 124 to compose a message as well, and this is indicated by block 224.

Figure 3A:
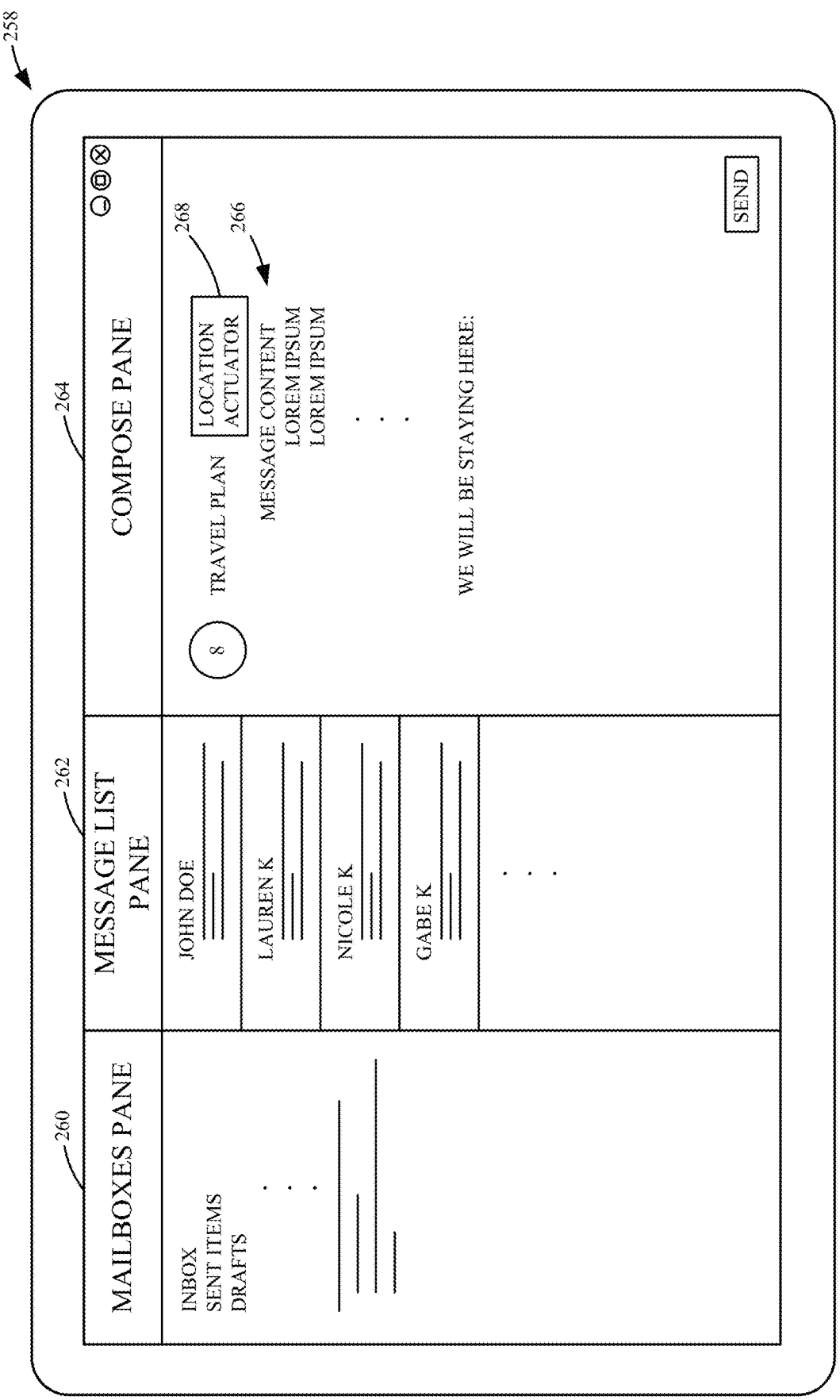
FIGS. 3A-3D show examples of user interface displays.

FIG. 3A is one example of a user interface display 258 in e-mail system 142 that allows user 124 to compose an email message. Display 258 illustratively includes a mailboxes pane 260, a message list pane 262 and a compose pane 264. Mailboxes pane 260 illustratively lists the various mailboxes that the user has configured on the e-mail system, such as an inbox, a sent items box, a drafts box, etc. Message list pane 262 illustratively includes identifying information identifying messages that have been received by the user, in the user's inbox. Compose pane 264 allows the user to input message content 266 in composing a message. In one example, compose pane 264 includes location actuator 268. If the user actuates location actuator 268, this activates the functionality of location integration system 152. In another example, as briefly described above, that functionality can be activated automatically based on the content of the message being authored. For instance, the message content can be subjected to natural language understanding or natural language processing to obtain an indication of the semantic content or linguistic content of the message. If that content indicates that the location integration functionality of system 152 should be activated, then that can be automatically detected.

In the example shown in FIG. 3A, it can be seen that the user has input the message content "We will be staying here:". A natural language understanding system illustratively recognizes this as a phrase or a set of words that will activate the location integration functionality. Of course, a wide variety of other messages could automatically trigger activation of that functionality as well, such as "Here's the map", "Where should we stay", and many other phrases or text segments, as well.

Location functionality detection logic 190, at some point, detects activation of location integration system functionality. This is indicated by block 226 in FIG. 3. As described above, this can be done by user input detector 192 detecting that user 124 has actuated location actuator 268, on the compose pane in the e-mail system. This is indicated by block 228. As also described above, automatic detector 194 can automatically detect that system 152 should be activated, such as based on content of the e-mail message itself, a context of the computing system, etc. This is indicated by block 230. Activation of the location integration system functionality can be detected in other ways as well, and this is indicated by block 232.

Location detection logic 192 then detects an input indicative of location information on which the interactive map display is to be based. Detecting input of the location information is indicated by block 234 in FIG. 3. In one example, the location information is the current location of the device on which system 152 is deployed. This is detected by current location detector 204, and is indicated by block 236 in the flow diagram of FIG. 3. In another example, the location information is input by the user, as detected by user-entered location detector 206. User-entered location information is indicated by block 238 in the flow diagram of FIG. 3. The location information can be detected in other ways as well, and this is indicated by block 240.

Map display integration logic 210 then accesses a map system (such as location processing system 144 or map service 114) to obtain information used to generate an interactive map display. This is indicated by block 242 in FIG. 3. This can be done, for instance, by calling an API exposed by location processing system 144 or map service 114, or in other ways. This is indicated by blocks 244 and 246 in FIG. 3. Map display integration logic then generates an interactive map display, and displays it for user interaction, based upon information received from the map system, given the location information. This is indicated by block 248 in FIG. 3. This can be done, for instance, by displaying it in a separate pane on the e-mail display, as indicated by block 250, or it can be done in the compose pane, as indicated by block 252. The interactive map display can be shown in other ways as well, and this is indicated by block 254.

In one example, the interactive map display has user input mechanisms that allow the user to perform map operations, such as to place a pin or location marker on the interactive map display. In another example, map display integration logic 210 illustratively automatically places the pin on the map, based upon the detected location information. Placing a pin on the interactive map display based on the detected location information is indicated by block 256 in the flow diagram of FIG. 3.

The user can also use the search other sources actuator 278 to search for other location information from the various other sources. This is indicated by block 257 in the flow diagram of FIG. 3. When this occurs, then map interaction logic 156 illustratively calls the exposed application programming interface for the other source to obtain the other location-based information. This is indicated by block 259.

Figure 3B:
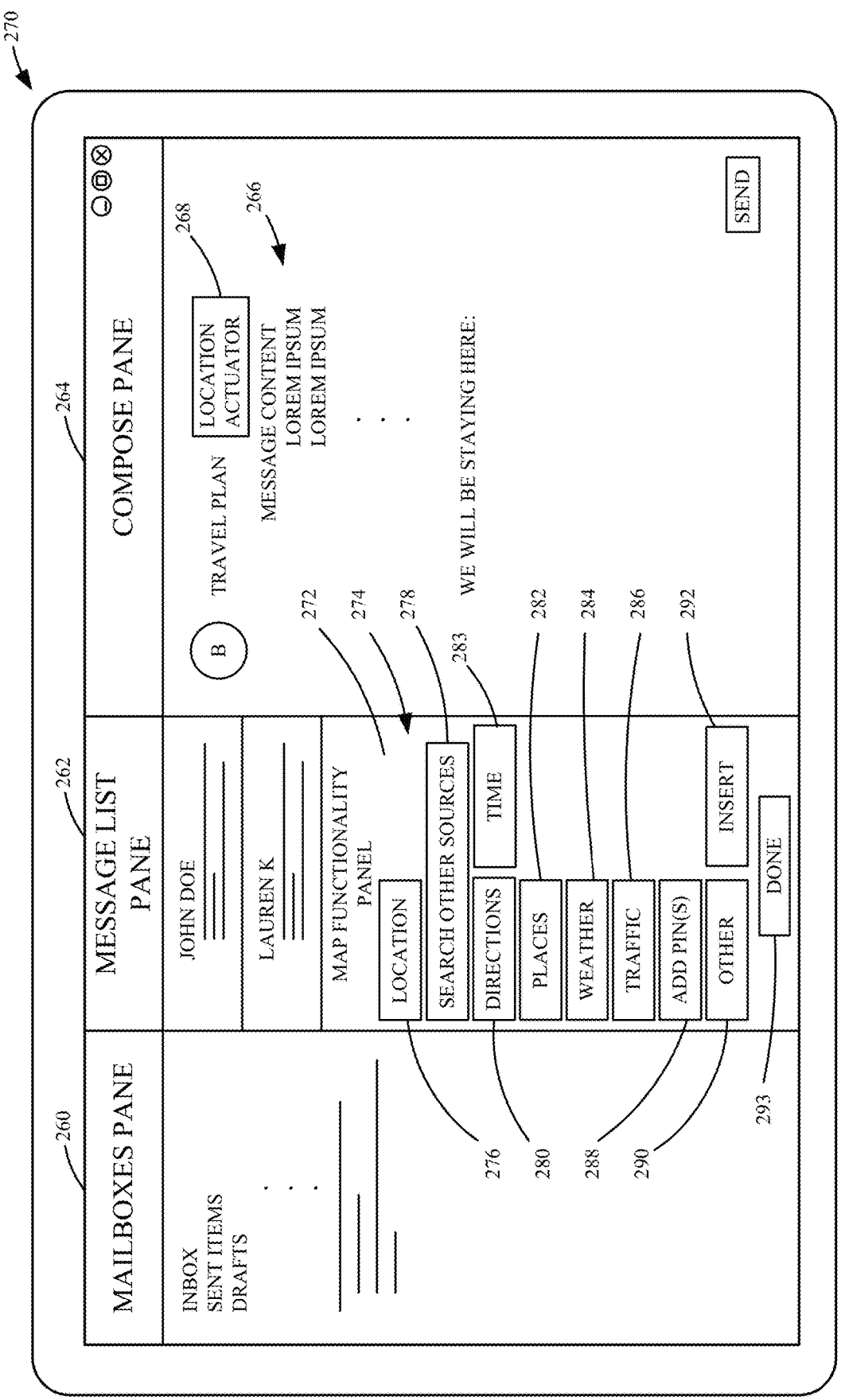

FIG. 3B shows a user interface display 270. Display 270 is similar to display 258 shown in FIG. 3A, and similar items are similarly numbered. However, it can be seen that, once the functionality of system 152 has been activated, a map functionality panel has now been displayed as indicated generally at 272 in FIG. 3B. Panel 272 illustratively includes a set of user actuatable display elements (or actuators) 274 that allow the user to perform a variety of map-related functions. For instance, location actuator 276 allows the user to input location information. The search actuator 278 allows the user to search other sources 108-112, or map service 114, for location-related information. Directions actuator 280 allows the user to obtain directions. Places actuator 282 illustratively causes map service 114 to locate places of interest (such as hotels, embassies, tourist attractions, or other places) proximate the location information. Weather actuator 284 illustratively causes the system to search a weather source to find current or future weather information corresponding to the detected location. Traffic actuator 286 illustratively causes the system to search a source for traffic information corresponding to the location. Add pins actuator 288 illustratively generates a user experience that allows the user to add pins, or other location markers, to a map. Time actuator 289 allows the user to specify a time of day as a parameter for location-based information. The panel 272 can include different or other actuators 290 as well. Information generated using these actuators can be integrated into the email message by map display integration logic 210 or additional information integration logic 212. They automatically format the information and insert it into the email message.

In addition, panel 272 illustratively includes an insert actuator 292. When the user is finished performing map-related functions, the user can actuate insert actuator 292 to insert a user-interactive map display into compose pane 264, in-line with message content 266.

The user can also use the search other sources actuator 278 to search for other location information from the various other sources. This is indicated by block 257 in the flow diagram of FIG. 3. When this occurs, then map interaction logic 156 illustratively calls the exposed application programming interface for the other source to obtain the other location-based information. This is indicated by block 259.

At some point, the user will provide a map integration input, such as by actuating the insert actuator 292. Map display integration logic 210 detects this and controls the e-mail system to integrate the interactive map display into the compose pane 264, in-line with the other message content 266. Detecting the integration input is indicated by block 261, and detecting it based on actuation of actuator 292 is indicated by block 263. Of course, the integration input can be detected automatically as well, such as by the user hitting the enter key or taking other actions that automatically cause map display integration logic 210 to automatically integrate the map into the compose pane in-line with the message content. Automatic detection of the integration input is indicated by block 265 in the flow diagram of FIG. 3. Controlling the e-mail system to integrate the map display into the compose pane is indicated by block 267 in FIG. 3. Once the location information (in the form of the map preview or interactive map display) is incorporated into the compose pane, the message is referred to herein as a location message. The user can send the location message by actuating the send actuator 302. Detecting user actuation of the send actuator is indicated by block 269. When that occurs, e-mail functionality 154 controls the e-mail system 142 to send the location message to the listed recipients. This is indicated by block 271 in FIG. 3.

Figure 3C:
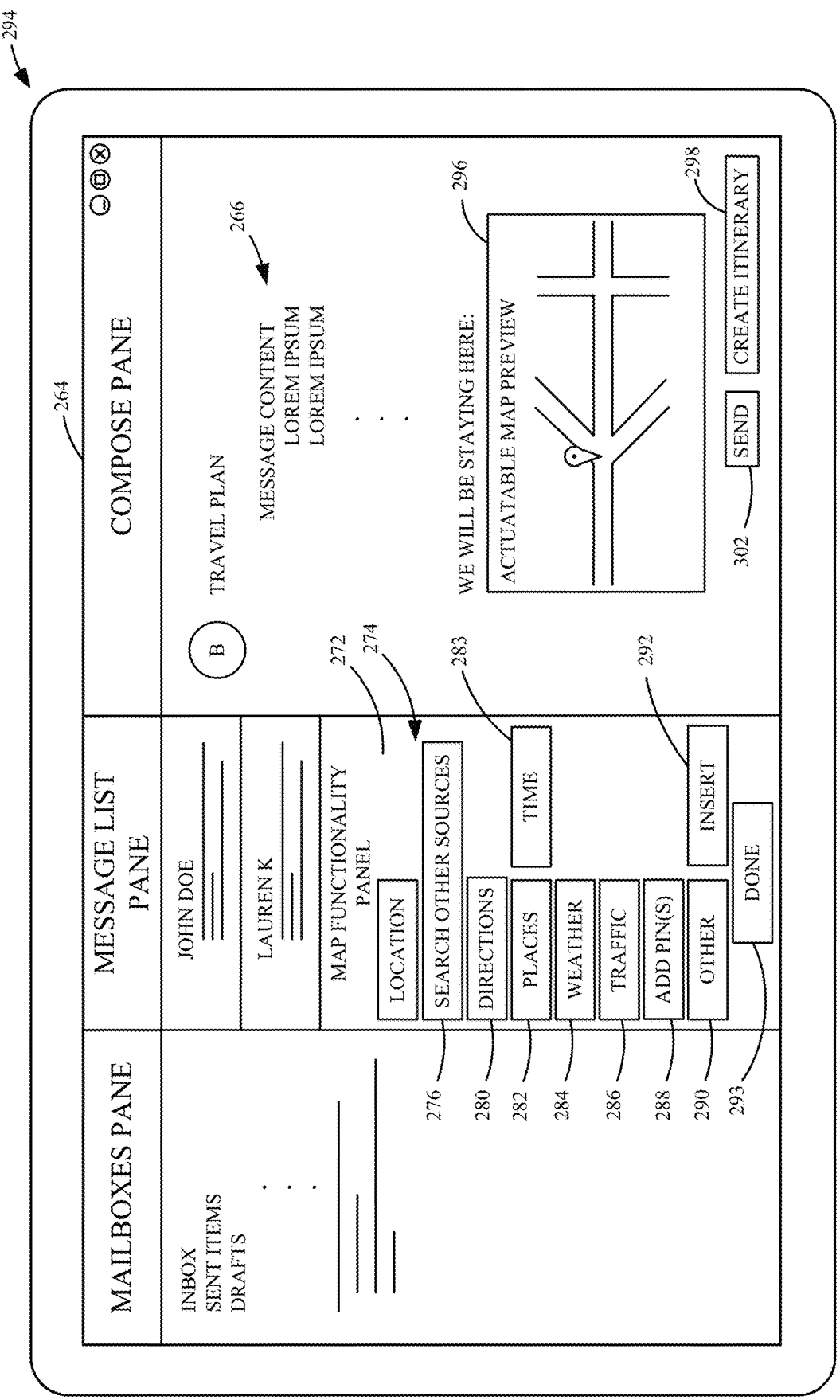

FIG. 3C shows another user interface display 294. Display 294 is similar to display 270 shown in FIG. 3B, and similar items are similarly numbered. However, display 294 now shows that the user has generated an interactive map display 296 and actuated insert actuator 292. Therefore, the interactive map display 296 is inserted in the compose pane 264, in the e-mail message. In one example, the interactive map display is first inserted as an actuatable map preview 296. When the author (or when a recipient) views the preview, they can actuate it (such as by touching or clicking on it). In response, map interaction logic 156 detects this and interacts with map service 114 to make the map into an interactive display, with user input mechanisms that can be actuated to perform mapping functionality on the display.

FIG. 3C also shows that the compose pane 264 is now populated with a "Create itinerary" actuator 298. As will be described in greater detail below, actuator 298 can be actuated to control itinerary generation logic 158 (in FIG. 1) to generate an itinerary from the information corresponding to the map display that is inserted in the location message. The user can continue to use the actuators on map functionality panel 272 to add, delete or modify information on the map display and, when finished, the user can actuate the "Done" actuator 293 on panel 272.

Figure 3D:
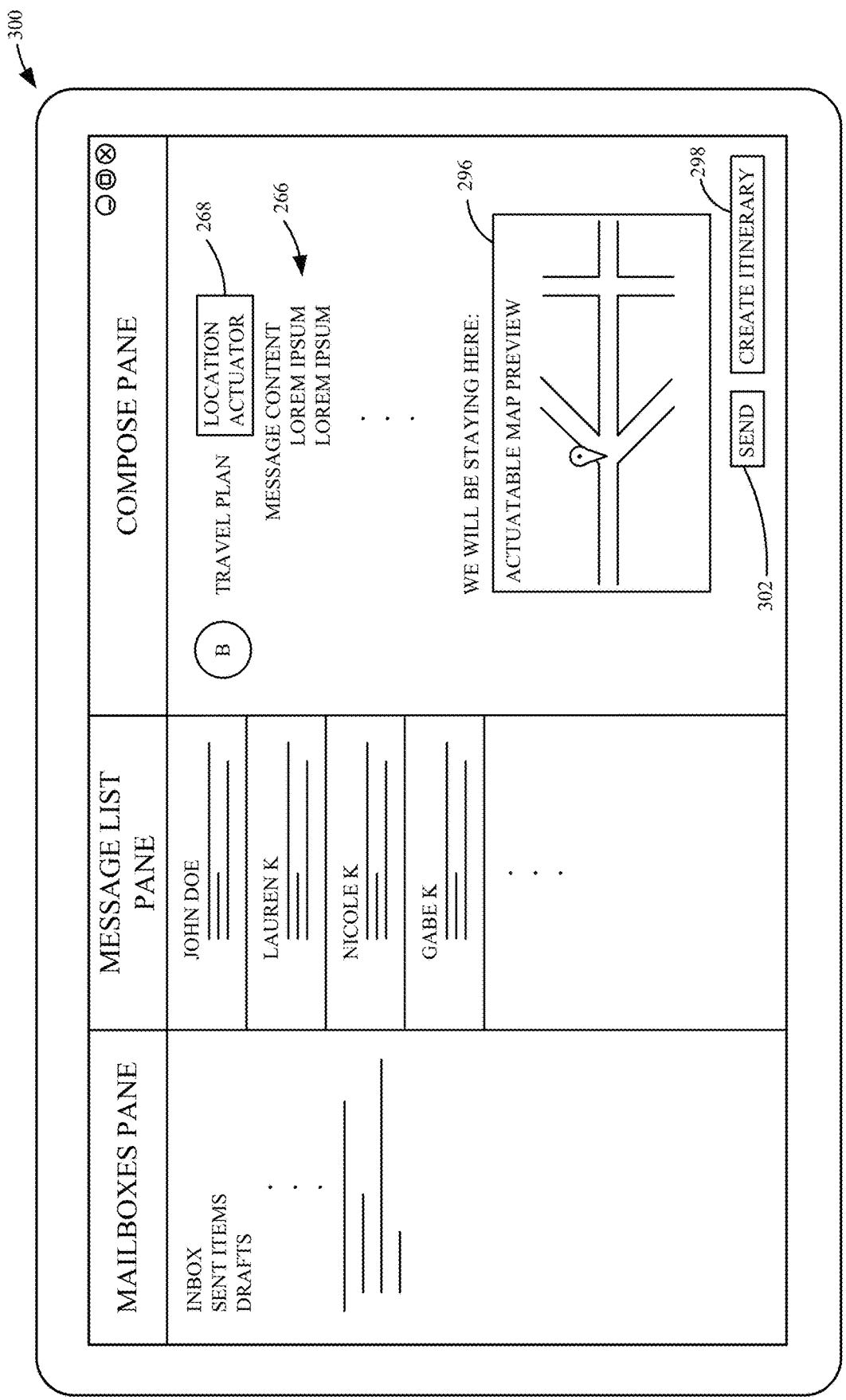

FIG. 3D shows another user interface display 300. Display 300 is similar to display 284 shown in FIG. 3C, and similar items are similarly numbered. However, it can now be seen that the user has actuated the "Done" actuator 293 so that map functionality panel 272 is no longer visible. The actuatable map preview 296 is now displayed, in-line with the other message content in compose pane 264. The user can now actuate the "Send" actuator 302 to send the location message to one or more recipients. The message is referred to as a location message, because it now has an actuatable map preview 296 integrated in-line with the other message content 266, which can be activated by a recipient to interact with the map display.

Figure 4:
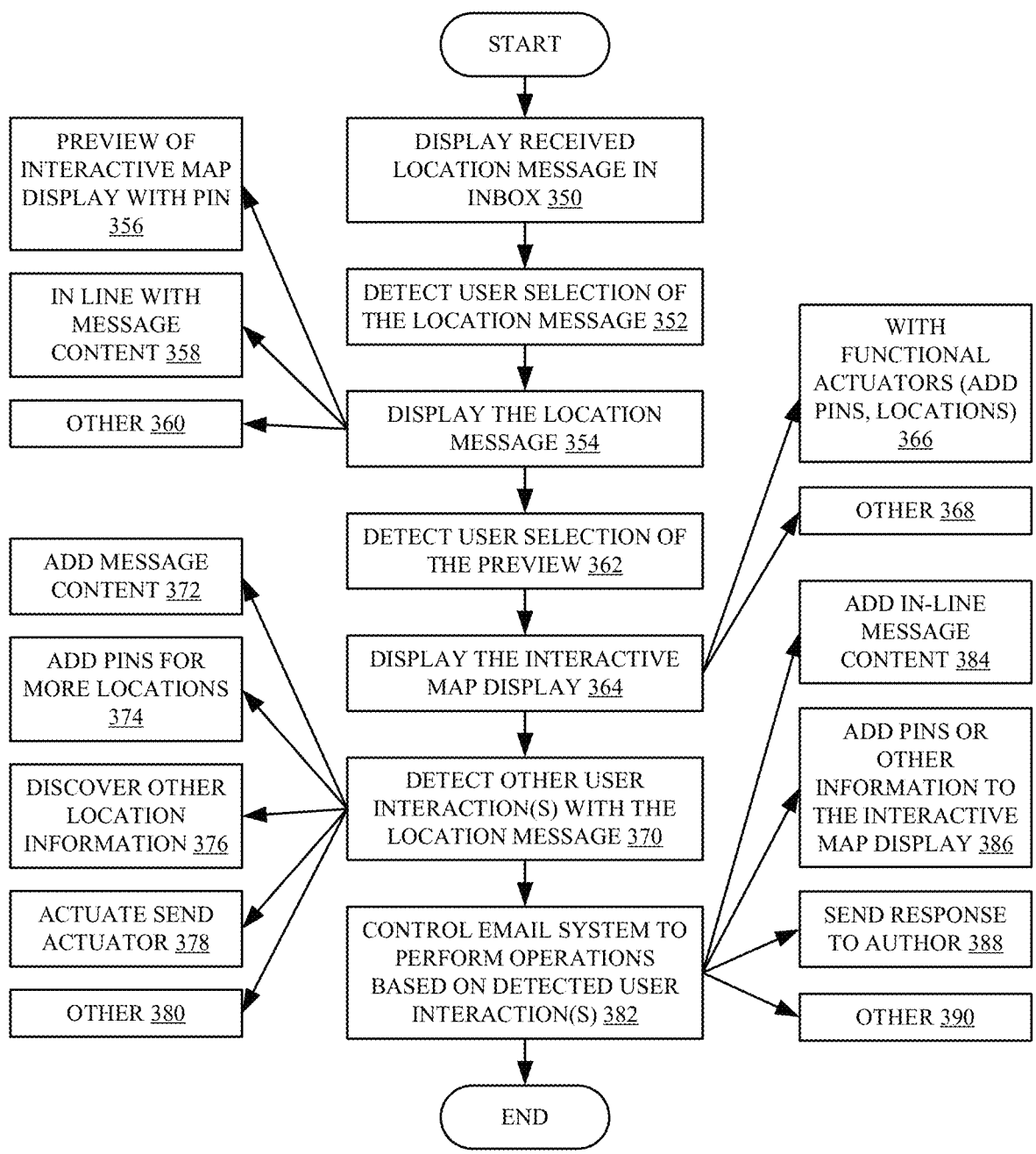
FIG. 4 is a flow diagram illustrating the operation of one example of the architecture shown in FIG. 1 in allowing a recipient to interact with a location message.

FIG. 4 is a flow diagram illustrating one example of the operation of architecture 100, when a recipient receives a location message. In one example, the recipient receives the location message in his or her inbox. This is indicated by block 350 in the flow diagram of FIG. 4. For the sake of the present example, it is assumed that user 136 is a recipient of the location message described above with respect to FIGS. 3-3D. The location message will illustratively show up in the user's message list pane, and it may include a visual indicator indicating that it is a location message.

At some point, user 136 will illustratively select the location message for display in the reading pane of the user's e-mail system. This is indicated by block 352. E-mail system 166 then illustratively displays the location message in the reading pane. This is indicated by block 354. It illustratively displays the preview of the interactive map display, with the pin, that was integrated into the message as shown in FIG. 3D. This is indicated by block 356 in the flow diagram of FIG. 4. The map preview is illustratively displayed in-line with the other message content in the location message. This is indicated by block 358. The location message can be displayed in other ways as well, and this is indicated by block 360.

In one example, the preview is an actuatable preview which can be selected by the user, such as by clicking on it, or otherwise selecting it. The user interaction detection logic in location integration system 168 illustratively detects user selection of the preview. This is indicated by block 362 in the flow diagram of FIG. 4.

The map display integration logic in location integration system 168 then calls the map service 114 (either directly or through map interaction logic 174) to convert the preview into an interactive map display. This is indicated by block 364. In doing so, it also illustratively displays functional actuators that allows the user 136 to perform mapping operations relative to the interactive display. For instance, user 136 can add pins, add locations, add other source information, using these actuators. This may be a similar experience to authorizing a location message, as described above, or different. Displaying the interactive map display with additional actuators is indicated by block 366.

The interactive map display can also display additional information, such as a textual description of the locations that are pinned in the interactive map display, or other information. This is indicated by block 368 in FIG. 4.

The user interaction detection logic in system 168 then detects any other user interactions with the location message. This is indicated by block 370. For instance, the user can add message content, in-line, either above or below the interactive map display (or the preview). This is indicated by block 372. The user can add pins for additional locations that the user has searched for. This is indicated by block 374. The user can discover other location information as indicated by block 376 or actuate the send actuator as indicated by block 378, to reply to the message. The user can interact with the location message in other ways as well, and this is indicated by block 380.

The user interaction detection logic in system 168 then provides an indication of the detected user interactions to the appropriate functionality in the e-mail system to control the e-mail system 166 to perform operations based on the detected user interactions. This is indicated by block 382 in the flow diagram of FIG. 4. For instance, it can control the e-mail system to add in-line message content, as indicated by block 384. It can control the map interaction logic 174 to add pins or other information into the interactive map display as indicated by block 386. It can send the response to the author, as indicated by block 388. The e-mail system can perform other operations, based upon the detected user interactions as well, and this is indicated by block 390.

Figure 5:
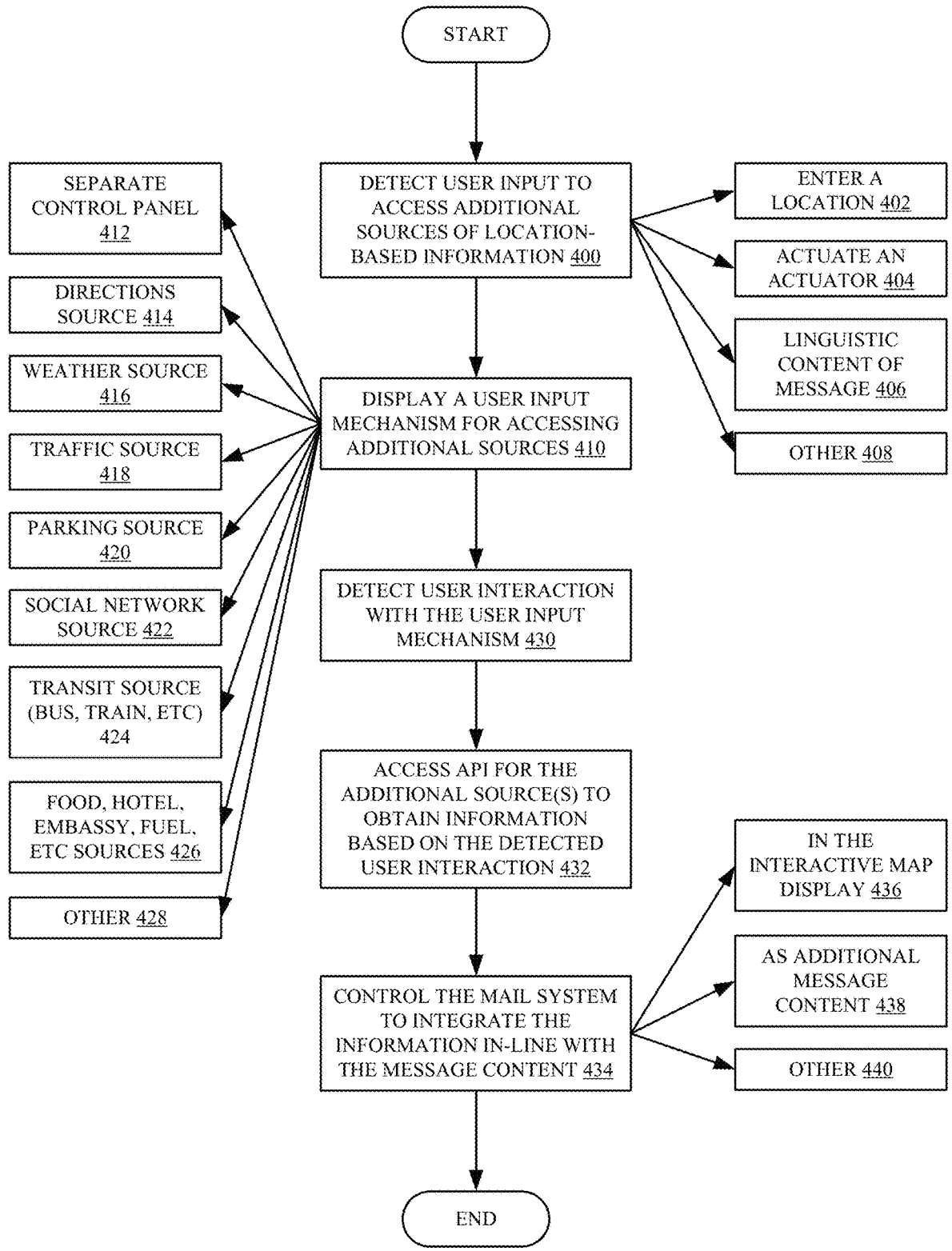
FIG. 5 is a flow diagram illustrating one example of the operation of the architecture shown in FIG. 1 in allowing a user to search for and incorporate additional location information into a location message.

FIG. 5 is a flow diagram illustrating one example of the operation of architecture 100 in allowing either user 124, or user 136, to search for and obtain other location information from the other sources 108-112, or for map service 114, etc. This can be done by either an author of a location message or by a recipient.

Additional information integration logic 212 first detects a user input to access additional sources of location-based information. This is indicated by block 400 in FIG. 5. For instance, the user can use actuator 176 to enter additional location information to search the sources. This is indicated by block 402. The user can actuate an actuator, such as weather actuator 284 or traffic actuator 286 to access a specific source 108-112. This illustratively causes additional information integration logic 212 to call an API on that specific source, either directly, or through map interaction logic 156. Detecting actuation of that actuator is indicated by block 404 in FIG. 5.

The user can also simply enter additional message content into the compose pane and natural language understanding system can generate an understanding of that content which can be used to search the other sources for additional information. For instance, the user may enter a phrase such as "What will the weather be like". This can be taken, in conjunction with the entered location information, to search a weather site for relevant location-based weather information. Using the linguistic content of the message to search the additional sources is indicated by block 406 in the flow diagram of FIG. 5. The additional sources can be searched in other ways as well, and this is indicated by block 408.

It may also be that the system can display a specific user input mechanism for accessing the additional sources, based upon a particular user input. For instance, if the user provides an input indicating that he or she wishes to access a weather site, then a specific weather user input mechanism can be displayed to allow the user to input parameters to be used in searching for weather information, in addition to the location. For instance, the user may be able to input a date range, a time range, etc. Displaying a user input mechanism for accessing additional sources of location-based information is indicated by block 410 in FIG. 5. The additional user input mechanism can be on a separate control panel as indicated by block 412, and as shown above in FIGS. 3B and 3C.

As mentioned above, there can be a wide variety of additional sources. They can include a source for directions as indicated by block 414, a source for location-based weather information is indicated by block 416, a source for traffic information is indicated by block 418, a source for parking information is indicated by block 420, or a social network source 422 which obtains location-based information from a social network (such as user likes, user reviews, etc.). They can include a source of transit information as indicated by block 424, such as a location of bus stations, train stations, etc. They can include a source of additional information such as restaurants, hotels, embassies, gas stations, etc. This is indicated by block 426. Of course, the user input mechanisms can access information from another source of additional information as well, and this is indicated by block 428.

When the user actuates the user input mechanism, then additional information integration logic 212 illustratively accesses an API corresponding to the source being accessed. It can do this directly, or through map interaction logic 156, in order to obtain the additional information. Detecting user interaction with a user input mechanism and accessing an API for the additional sources to obtain information based on the detected user interaction is indicated by block 430 and 432 in FIG. 5.

Once the additional information is obtained, additional information integration logic 212 controls e-mail system 142 to integrate that additional information in-line with the message content in the message. This is indicated by block 434. It can be within the interactive map display (or preview) that is being integrated in-line with the message. This is indicated by block 436. It can also be integrated as additional message content, such as textually descriptive weather information, traffic information, direction information that is integrated into the message content of the message. This is indicated by block 438. It can be integrated in-line with the message content in other ways as well, and this is indicated by block 440.

FIG. 6 is one example of a more detailed block diagram of itinerary generation logic 158 (shown in FIG. 1). Logic 158 illustratively includes itinerary functionality detection logic 442, parameter processing system 444 (which, itself, includes parameter input mechanism generator 446, actuation detector 448, and it can include other items 450), and proposed itinerary generator 452. It can include other items 454 as well. Proposed itinerary generator 452 illustratively includes schedule generation logic 456, additional information generation logic 458, itinerary output component 460, modification component 462, and it can include other items 464.

FIG. 7 is a flow diagram illustrating one example of the operation of itinerary generation logic 158 in generating an itinerary from the location information input relative to the interactive map display in the location message. FIG. 7A shows one example of a user interface display. FIGS. 6-7A will now be described in conjunction with one another.

It is assumed for the sake of the present discussion that location information in an interactive map display is being displayed in the user's e-mail system. This is indicated by block 466 in FIG. 7. For instance, it may be in an author's compose pane. It may be in a recipient's reading pane, or it may be displayed in other ways.

Itinerary functionality detection logic 442 then detects user actuation of the itinerary generation actuator (such as actuator 298 in FIG. 3C). This is indicated by block 468 in FIG. 7. Parameter processing system 444 (and specifically parameter input mechanism generator 446) then generates a user interface display with a user parameter input mechanism that allows the user to enter any additional parameters to be used in generating the itinerary. This is indicated by block 470. For instance, it may allow the user to enter a starting date for the itinerary as well as dates on which the user wishes to visit certain locations. This is indicated by block 472. It may allow the user to enter information indicative of a time of day that the user wishes to be at a certain spot. This is indicated by block 474. The parameter user input mechanism can allow the user to enter other parameters as well, and this is indicated by block 476. Actuation detector 448 detects the user actuating the parameter actuators so that they can be input.

Once any additional parameters have been input by the user, schedule generation logic 456 illustratively accesses the various items of location information, any additional information that has been input relative to the interactive map display, and any additional parameters that have been input by the user, and generates a proposed itinerary for display to the user. Generating the proposed itinerary is indicated by block 478 in FIG. 7.

The proposed itinerary can include information such as dates 480, directions to various locations 482 on the itinerary, travel data 484 (such as what time traffic is bad, how long it will take to travel to the next location on the itinerary, etc.). It can include weather data 486 indicative of expected weather conditions, and the proposed itinerary can include a wide variety of other information 488.

Schedule generation logic 456 then generates a display of the proposed itinerary with itinerary modification input mechanisms, that can be actuated to modify the itinerary. The display of the proposed itinerary will also include any additional information generated by additional information generation logic 458 (such as the directions, travel data, weather data, etc.). Generating a display of the proposed itinerary with the modification user input mechanisms is indicated by block 490 in FIG. 7.

Modification component 462 then detects actuation of any of the modification user input mechanisms and modifies the itinerary based on the detected actuations. This is indicated by block 492. For instance, the user may modify a date or time in the itinerary, a location, an order of places to be visited, etc.

When the user is satisfied with the itinerary, the user can actuate an integration actuator and itinerary generation logic 158 illustratively controls e-mail system 142 to integrate a representation of the itinerary into the e-mail message, in-line with the message content on the compose pane, or the reading pane. This is indicated by block 494.

The itinerary output component 460 can also output an itinerary record, representing the itinerary, for storage in a separate location. This is indicated by block 496. The itinerary can also be attached to an e-mail message as indicated by block 498, or it can be output in other ways as well, as indicated by block 500.

FIG. 7A shows one example of a user interface display 502 with an itinerary displayed therein. Some of the items are similar to the previous user interface displays, and they are similarly numbered. The compose pane illustratively includes message content 266 and the actuatable map preview 296 displayed in-line with content 266. Similarly, a proposed itinerary 504 is also displayed in-line with the message content, and with the actuatable map preview 296. The example itinerary shown in FIG. 7A includes a plurality of locations 506, 508, 510 and each location can have additional information, such as a date and time 512 when the user is to arrive at the location, and other information 514 (such as weather information, traffic information, hotel information, transit information, etc.).

Display 502 also shows one example of the itinerary modification user input mechanism 516. Mechanism 516 is illustratively an itinerary modification panel with modification actuators 520-522 and it can include other items 524. The user can illustratively actuate actuators 520-522 in order to make modifications to the itinerary 504. For instance, one actuator may allow the user to modify dates and times. Another actuator may allow the user to modify locations or to rearrange locations, etc.

FIG. 7A also shows one example in which itinerary 504 includes a directions actuator 526. When the user actuates actuator 526, itinerary navigation logic 160 may access sources of information (such as map service 114) to obtain directions to the various locations identified on itinerary 504. This is but one example of an itinerary and a wide variety of others can be generated as well.

It can thus be seen that with an interactive map display shown in-line with message content, a user need not navigate to a separate user interface display in order to see and use a map display. Instead, the user can see and interact with the map display directly from the compose pane or reading pane of the e-mail message. Similarly, the author or recipient can search for and incorporate a wide variety of other location-based information. When the user actuates an actuator to do this, the system accesses APIs exposed by corresponding sources of information to surface information for display to the user. The user can then integrate that additional information into the location message, in-line with the other message content. Again, the user need not navigate to a separate user interface display of a separate system in order to do this. This not only makes the user experience much more intuitive and less cumbersome, but it improves the speed of the computing system. The computing system need not render an entire user interface display generated by a mapping system. Instead, it need only render certain functionality in the interactive map display in the e-mail system.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

FIG. 8 is a block diagram of architecture 100, shown in FIG. 1, except that its elements are disposed in a cloud computing architecture 550. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in FIG. 1 and they are similarly numbered. FIG. 8 specifically shows that map service 114 and email systems 142 and 166 can be located in cloud 552 (which can be public, private, or a combination where portions are public while others are private). Therefore, users 124, 126, 136 and 138 can use user devices 556, 558, 560 and 562 to access those systems through cloud 552.

FIG. 8 also depicts another example of a cloud architecture. FIG. 8 shows that it is also contemplated that some elements of architecture 100 can be disposed in cloud 552 while others are not. By way of example, data stores 148 and 184 can be disposed outside of cloud 552, and accessed through cloud 552. In another example, location integration systems 152 and 168 can be outside of cloud 552. Regardless of where they are located, they can be accessed directly by the user devices, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

FIG. 9 is a simplified block diagram of one illustrative embodiment of a handheld or mobile computing device that can be used as a user's or client's hand held device 16, in which the present system (or parts of it) can be deployed. FIGS. 10-11 are examples of handheld or mobile devices.

FIG. 9 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1× rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 10 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1x rtt, and Short Message Service (SMS) signals. In some examples the phone also includes a Secure Digital (SD) card slot that accepts a SD card.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 12 is one example of a computing environment in which architecture 100, or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

an electronic mail (email) system that generates an email user interface display with a compose pane that receives and displays message content in an email message;

a location integration system that receives location information and generates an interactive map display based on the location information; and email population logic that controls the email system to populate the compose pane with a selectable representation of the interactive map display, to generate a location email message, the selectable representation of the interactive map display being selectable by a recipient of the location email message.

Example 2 is the computing system of any or all previous examples wherein the email population logic generates a set of user actuatable map functionality actuators that are displayed on the email user interface display and are each actuated to perform a corresponding map function on the interactive map display, the email population logic interacting with an interface exposed by a location information source, based on user actuation of a given map functionality actuator, to perform the corresponding map function.

Example 3 is the computing system of any or all previous examples wherein the email population logic generates, as one of the set of map functionality actuators, a location marker actuator that, when actuated, controls the interactive map display to display a location marker on the interactive map display based on the location information.

Example 4 is the computing system of any or all previous examples wherein the email population logic comprises:

map display integration logic that generates the selectable representation of the interactive map display as a selectable preview of the interactive map display, and integrates the selectable preview of the interactive map display, with the location marker displayed thereon, into the location email message, in-line with the message content on the compose pane.

Example 5 is the computing system of any or all previous examples wherein the set of map functionality actuators comprises a plurality of different actuators each corresponding to a source of additional, location-based information and wherein the email population logic comprises:

additional information integration logic that integrates the additional, location-based information into the location email message, in-line with the message content on the compose pane and the selectable preview of the interactive map display.

Example 6 is the computing system of any or all previous examples and further comprising:

itinerary generation logic that accesses the interactive map display to identify location information corresponding to location markers on the interactive map display and generates an itinerary record indicative of an itinerary, based on the location information corresponding to the location markers.

Example 7 is the computing system of any or all previous examples wherein the itinerary generation logic comprises:

a parameter processing system that generates a parameter input mechanism that is actuated to input a parameter for parameterizing the itinerary, the itinerary generation logic generating the itinerary record based on the parameter.

Example 8 is the computing system of any or all previous examples wherein the itinerary generation logic comprises:

a modification component that generates a user actuatable modification actuator that is actuated to modify the itinerary record.

Example 9 is the computing system of any or all previous examples wherein the location integration system comprises:

location functionality detection logic that detects an activation input to activate functionality of the location integration system to generate the interactive map display.

Example 10 is the computing system of any or all previous examples wherein the location functionality detection logic controls the email system to display, on the compose pane, a location actuator, and wherein the location functionality detection logic comprises:

a user input detector that detects user actuation of the location actuator on the compose pane.

Example 11 is the computing system of any or all previous examples wherein the location functionality detection logic comprises:

an automatic detector that detects the activation input based on a linguistic content of the message content in the email message.

Example 12 is the computing system of any or all previous examples wherein the location integration system comprises:

location detection logic that detects the location information.

Example 13 is the computing system of any or all previous examples wherein the location detection logic comprises:

a current location detector that detects a current location of the location integration system as the location information.

Example 14 is the computing system of any or all previous examples wherein the location detection logic comprises:

a user-entered location detector that displays a location input mechanism and detects user actuation of the location input mechanism to obtain the location information.

Example 15 is a computer implemented method, comprising:

generating an email user interface display with a compose pane that receives and displays message content in an email message;

receiving location information;

generating an interactive map display based on the location information; and controlling an email system to populate the compose pane with a selectable representation of the interactive map display, to generate a location email message, the selectable representation of the interactive map display being selectable by a recipient of the location email message.

Example 16 is the computer implemented method of any or all previous examples and further comprising:

generating a set of user actuatable map functionality actuators that are displayed on the email user interface display and are each actuated to perform a corresponding map function on the interactive map display;

detecting actuation of a given map functionality actuator;

accessing an interface exposed by a location information source, based on user actuation of the given map functionality actuator; and performing the corresponding map function.

Example 17 is the computer implemented method of any or all previous examples wherein generating a set of map functionality actuators comprises:

generating, as one of the set of map functionality actuators, a location marker actuator;

detecting actuation of the location marker actuator; and controlling the interactive map display to display a location marker on the interactive map display based on the location information.

Example 18 is the computer implemented method of any or all previous examples wherein controlling the email system to populate the compose pane comprises:

generating the selectable representation of the interactive map display as a selectable preview of the interactive map display; and integrating the selectable preview of the interactive map display, with the location marker displayed thereon, into the location email message, in-line with the message content on the compose pane.

Example 19 is the computer implemented method of any or all previous examples and further comprising:

accessing the interactive map display to identify location information corresponding to location markers on the interactive map display; and generating an itinerary record indicative of an itinerary, based on the location information corresponding to the location markers.

Example 20 is a computing system, comprising:

an electronic mail (email) system that generates an email user interface display with a compose pane that receives and displays message content in an email message;

a location integration system that receives location information and generates an interactive map display based on the location information; and email population logic that controls the email system to generate a location marker actuator that, when actuated, controls the interactive map display to display a location marker on the interactive map display based on the location information, the email population logic being configured to populate the compose pane with a selectable representation of the interactive map display, with the location marker displayed thereon, in-line with the message content on the compose pane to generate a location email message, the selectable representation of the interactive map display being selectable by a recipient of the location email message.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   a processor; and
   memory storing instructions executable the processor, wherein the instructions, when executed, configure the computing system to provide:
   an electronic mail (email) system configured to:
   generate an email user interface display with a compose pane configured to receive user input that defines message content in an email message and display the message content;
   a location integration system configured to:
   receive location information; and
   generate an interactive map display based on the location information; and
   email population logic configured to:
   control the email system to populate the compose pane with the interactive map display, the email user interface display including a map interaction user input mechanism, and
   based on user actuation of the map interaction, user input mechanism, modify the interactive map display,
   wherein the email system is configured to:
   generate a location email message that includes the modified interactive map display, and
   send the location email message, including the modified interactive map display, to a recipient, wherein the modified interactive map display is selectable by the recipient of the location email message.

2. The computing system of claim 1 wherein the email population logic is configured to:
   display a set of user actuatable map functionality actuators on the email user interface display, each user actuatable map functionality actuator being associated with a corresponding map function and being actuatable to perform the corresponding map function on the interactive map display; and
   based on user actuation of a particular one of the map functionality actuators, interact with an interface exposed by a location information source to perform the map function corresponding to the particular map functionality actuator.

3. The computing, system of claim 2 wherein
   the email population logic is configured to:
   generate, as one of the set of map functionality actuators, a location marker actuator that, when actuated, controls the interactive map display to display a location marker on the interactive map display based on the location information, and
   wherein the email system is configured to:
   send the location email message, including the modified interactive map display with the location marker, to the recipient.

4. The computing system of claim 3 wherein the email population logic comprises:
   map display integration logic configured to:
   generate a selectable preview of the interactive map display; and
   integrate the selectable preview of the interactive map display, with the location marker displayed thereon, into the location email message, in-line with the message content on the compose pane.

5. The computing system of claim 4 wherein the set of map functionality actuators comprises a plurality of different actuators each corresponding to a source of additional, location-based information and wherein the email population logic comprises:
   additional information integration logic configured to integrate the additional, location-based information into the location email message, in-line with the message content on the compose pane and the selectable preview of the interactive map display.

6. The computing system of claim 3 wherein the instructions, when executed, configure the computing system to provide:
   itinerary generation logic is configured to:
   access the interactive map display to identify location information corresponding to location markers on the interactive map display; and
   generate an itinerary record indicative of an itinerary, based on the location information corresponding to the location markers,
   wherein the email population logic is configured to populate the location email message with the itinerary record.

7. The computing system of claim 6 wherein the itinerary generation logic comprises:
   a parameter processing system configured to generate a parameter input mechanism that is actuated to input a parameter for parameterizing the itinerary, the itinerary generation logic configured to generate the itinerary record based on the parameter.

8. The computing system of claim 7 wherein the itinerary generation logic comprises:
   a modification component configured to generate a user actuatable modification actuator that is actuated to modify the itinerary record.

9. The computing system of claim 1 wherein the location integration system comprises:
   location functionality detection logic configured to detect an activation input to activate functionality of the location integration system to generate the interactive map display.

10. The computing system of claim 9 wherein, the location functionality detection logic is configured to control the email system to display, on the compose pane, a location actuator, and wherein the location functionality detection logic comprises:
    a user input detector configured to:
    detect user actuation of the location actuator on the compose pane; and
    based on the detected user actuation, activate functionality of the location integration system generate the interactive map display.

11. The computing system of claim 9 wherein the location functionality detection logic comprises:
    an automatic detector configured to detect the activation input based on a linguistic content of the message content in the email message.

12. The computing system of claim 9 wherein the location integration system comprises:
    location detection logic configured to detect the location information.

13. The computing system of claim 12 wherein the location detection logic comprises:

a current location detector configured to detect a current, location of the location integration system as the location information.

14. The computing system of claim 12 wherein the location detection logic comprises:
a user-entered location detector configured to:
display a location input mechanism; and
detect user actuation of the location input mechanism to obtain the location information.

15. A computer implemented method, comprising:
generating an email user interface display with a compose pane
receiving user input in the compose pane that defines message content in an email message;
displaying the message content in the compose pane;
performing linguistic on the message content to identify location information in the message content;
based on identifying, location information in the message content in the email message, activating location integration functionality to generate an interactive map display based on the location information;
populating the compose pane with the interactive map display including a map interaction user input mechanism that is actuatable to modify the interactive map display;
modifying the interactive map display based on user actuation of the map interaction user input mechanism; and
sending the email message, including the modified interactive map display, to a recipient.

16. The computer implemented method of claim 15 and further comprising:
generating a set of user act/unable map functionality actuators that are displayed on the email user interface display and are each actuated to perform a corresponding map function on the interactive map display;
detecting actuation of a given map functionality actuator;
accessing an interface exposed by a location information source, based on user actuation of the given map functionality actuator; and
performing the corresponding map function.

17. The computer implemented method of claim 16 wherein generating a set of map functionality actuators comprises:

generating, as one of the set of map functionality actuators, a location marker actuator;
detecting actuation of the location marker actuator; and,
controlling the interactive map display to display a location marker on the interactive map display based on the location information.

18. The computer implemented method, of claim 17 wherein controlling the email system to populate the compose pane comprises:
generating the interactive map display as a selectable preview of the interactive map display; and
integrating the selectable preview of the interactive map display, with the location marker displayed thereon, into the location email message, in-line with the message content on the compose pane.

19. The computer implemented method of claim 18 and further comprising:
accessing the interactive map display to identify location information corresponding to location markers on the interactive map display; and
generating an itinerary record indicative of an itinerary, based on the location information corresponding to the location markers.

20. A method performed by a computing system, the method comprising:
generating an interactive map display based on location information;
generating an email user interface display comprising:
a compose pane configured to receive user input that defines message content in an email message and display the message content, and
a location marker actuator;
displaying the interactive map display on the compose pane in-line with the message content;
based on user actuation of the location marker actuator on the email user interface display, adding a location marker on the interactive map display that is displayed on the compose pane;
sending the email message, including the interactive map display with the location marker, to a recipient, wherein the interactive map display is selectable by the recipient of the location email message.

* * * * *